United States Patent
Lee et al.

(10) Patent No.: US 10,748,260 B2
(45) Date of Patent: Aug. 18, 2020

(54) IMAGE PROCESSING METHOD AND DISPLAY APPARATUS THEREFOR PROVIDING SHADOW EFFECT

(71) Applicant: SAMSUNG ELECTRONICS CO., LTD., Suwon-si (KR)

(72) Inventors: Yunho Lee, Suwon-si (KR); Jaeyoung You, Suwon-si (KR); Kwansik Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/227,784

(22) Filed: Dec. 20, 2018

(65) Prior Publication Data

US 2019/0197672 A1    Jun. 27, 2019

(30) Foreign Application Priority Data

Dec. 22, 2017 (KR) .......................... 10-2017-0178540

(51) Int. Cl.
*G09G 5/02* (2006.01)
*G06T 5/00* (2006.01)
(Continued)

(52) U.S. Cl.
CPC .............. *G06T 5/008* (2013.01); *G06F 3/14* (2013.01); *G06T 11/001* (2013.01); *G06T 15/60* (2013.01);
(Continued)

(58) Field of Classification Search
None
See application file for complete search history.

(56) References Cited

U.S. PATENT DOCUMENTS 6,587,596 B1* 7/2003 Haeberli ................. G06T 11/60
345/626
7,973,796 B1 7/2011 Marston
(Continued)

FOREIGN PATENT DOCUMENTS

EP          2 791 911          6/2013
KR    10-2009-0075234 A      7/2009
(Continued)

OTHER PUBLICATIONS

International Search Report and Written Opinion (PCT/ISA/210) dated Mar. 29, 2019 issued by the International Searching Authority in International Application No. PCT/KR2018/016440.
(Continued)

*Primary Examiner* — Anh-Tuan V Nguyen
(74) *Attorney, Agent, or Firm* — Sughrue Mion, PLLC

(57) ABSTRACT

An image processing method and a display apparatus therefor are provided. The display apparatus includes a display, a communicator that communicates with an external device; a memory storing one or more instructions; and a controller including a processor for executing the one or more instructions stored in the memory. The processor is configured to execute the one or more instructions to receive an image from the external device, obtain information about a first distance corresponding to a distance between a front surface of the display apparatus and a wall, and, when the image is displayed on the display, apply a shadow effect to one or more of sides of the image based on the information about the first distance.

18 Claims, 20 Drawing Sheets

(51) Int. Cl.
*G09G 5/10* (2006.01)
*G06T 11/00* (2006.01)
*G09G 3/00* (2006.01)
*G06T 15/60* (2006.01)
*G06F 3/14* (2006.01)
*G09G 3/20* (2006.01)

(52) U.S. Cl.
CPC ............... *G09G 3/003* (2013.01); *G09G 3/20* (2013.01); *G09G 5/10* (2013.01); *G06T 2200/24* (2013.01); *G09G 2310/0232* (2013.01); *G09G 2320/0261* (2013.01); *G09G 2320/0666* (2013.01); *G09G 2320/0686* (2013.01); *G09G 2340/12* (2013.01); *G09G 2354/00* (2013.01); *G09G 2360/144* (2013.01); *G09G 2380/16* (2013.01)

(56) References Cited

U.S. PATENT DOCUMENTS

| | | | | |
|---|---|---|---|---|
| 9,342,467 | B1* | 5/2016 | McGrath | G09G 3/003 |
| 9,693,646 | B2* | 7/2017 | Brill | A47G 33/00 |
| 9,721,540 | B2* | 8/2017 | Kim | G06T 19/006 |
| 9,881,414 | B2 | 1/2018 | Lee et al. | |
| 2007/0257928 | A1* | 11/2007 | Marks | G06F 3/14 |
| | | | | 345/581 |
| 2008/0143890 | A1* | 6/2008 | Rosencwaig | G06F 3/147 |
| | | | | 348/836 |
| 2010/0002905 | A1* | 1/2010 | Van Berkel | H01J 49/0459 |
| | | | | 382/100 |
| 2011/0193876 | A1* | 8/2011 | Handa | G06T 11/001 |
| | | | | 345/595 |
| 2012/0069055 | A1* | 3/2012 | Otsuki | G06F 3/017 |
| | | | | 345/681 |
| 2012/0169718 | A1* | 7/2012 | Schindler | G02B 27/2278 |
| | | | | 345/419 |
| 2013/0100266 | A1* | 4/2013 | Salsman | G06K 9/00221 |
| | | | | 348/77 |
| 2013/0113701 | A1* | 5/2013 | Sasaki | G06T 15/20 |
| | | | | 345/156 |
| 2013/0127836 | A1* | 5/2013 | Joshi | G06T 11/203 |
| | | | | 345/419 |
| 2013/0147793 | A1 | 6/2013 | Jeon et al. | |
| 2014/0160100 | A1 | 6/2014 | Edgren | |
| 2014/0253606 | A1 | 9/2014 | Yun et al. | |
| 2014/0267248 | A1* | 9/2014 | Zou | G06T 15/60 |
| | | | | 345/420 |
| 2015/0116354 | A1 | 4/2015 | Tomlin et al. | |
| 2015/0124086 | A1* | 5/2015 | Melle | G01B 11/002 |
| | | | | 348/136 |
| 2015/0339023 | A1 | 11/2015 | Park et al. | |
| 2016/0019718 | A1* | 1/2016 | Mukkamala | G06F 3/011 |
| | | | | 345/419 |
| 2016/0188195 | A1* | 6/2016 | Chen | H04N 9/3185 |
| | | | | 715/765 |
| 2017/0160626 | A1* | 6/2017 | Muramatsu | G03B 21/145 |
| 2017/0222986 | A1 | 8/2017 | Trachtenberg et al. | |
| 2017/0231052 | A1 | 8/2017 | Li et al. | |
| 2017/0310898 | A1 | 10/2017 | Misawa et al. | |
| 2017/0316757 | A1 | 11/2017 | Whang et al. | |
| 2018/0091738 | A1* | 3/2018 | Takahashi | H04N 7/14 |

FOREIGN PATENT DOCUMENTS

| | | | | | |
|---|---|---|---|---|---|
| KR | 20110055090 | A | * | 5/2011 | ............ G06T 15/50 |
| KR | 10-2013-0065047 | A | | 6/2013 | |
| KR | 10-2013-0094380 | A | | 8/2013 | |
| KR | 10-2016-0094078 | A | | 8/2016 | |
| KR | 20160094078 | A | * | 8/2016 | ............ G06T 15/60 |
| KR | 10-2017-0074548 | A | | 6/2017 | |

OTHER PUBLICATIONS

Communication dated Apr. 23, 2019, issued by the Korean Intellectual Property Office in counterpart Korean Application No. 10-2017-0178540.
Communication dated May 16, 2019, issued by the European Patent Office in counterpart European Application No. 18214831.2.
"Method and system for shadow creation of Digital object in transparent display", Apr. 13, 2016, pp. 1-2, 3 pages total, XP013171261.
Sugano et al., "The Effects of Shadow Representation of Virtual Objects in Augmented Reality", Oct. 2003, 8 pages total, XP058187364.
Eisemann et al., "Plausible Image Based Soft Shadows Using Occlusion Textures", Oct. 2006, 8 pages total, XP031036006.
Kolivand et al., "Shadow Generation in Mixed Reality: A Comprehensive Survey", Dec. 2014, pp. 3-15, 14 pages total, XP055584864.
Communication dated Oct. 9, 2019 issued by the European Intellectual Property Office in counterpart European Application No. 18214831.2.

* cited by examiner

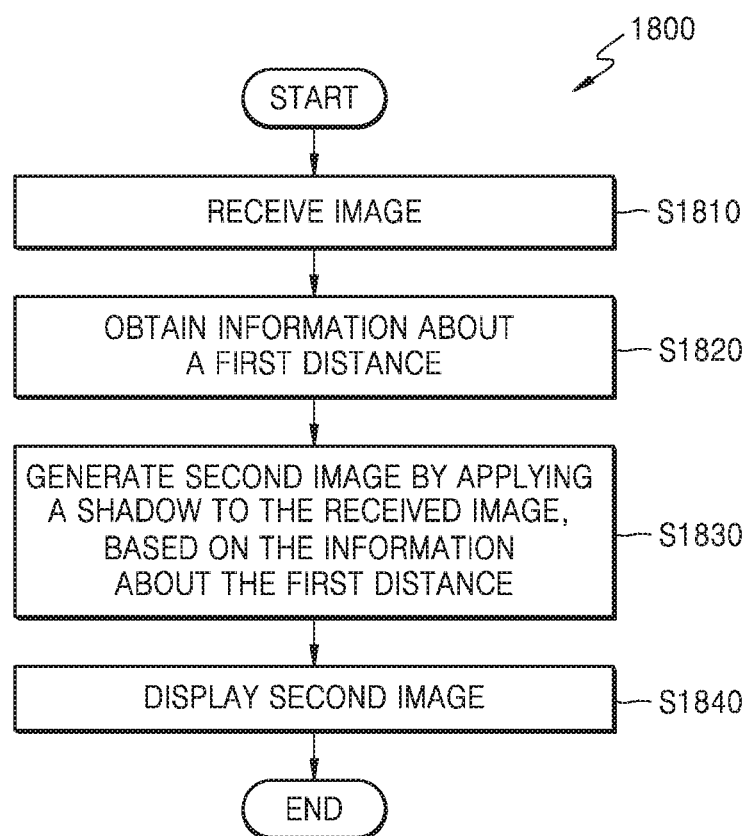

IMAGE PROCESSING METHOD AND DISPLAY APPARATUS THEREFOR PROVIDING SHADOW EFFECT

CROSS-REFERENCE TO RELATED APPLICATION

This application is based on and claims priority under 35 U.S.C. § 119 to Korean Patent Application No. 10-2017-0178540, filed on Dec. 22, 2017, in the Korean Intellectual Property Office, the disclosure of which is incorporated by reference herein in its entirety.

BACKGROUND

1. Field

The disclosure relates to an image processing method and a display apparatus therefor.

More particularly, the disclosure relates to an image processing method for performing image processing to apply certain effects to certain images and a display apparatus therefor.

Furthermore, the disclosure relates to an image processing method for adjusting a perspective or depth of an image output through a display apparatus and a display apparatus therefor.

2. Description of the Related Art

Due to the popularization of displays and development of related technologies, display apparatuses having various forms and various functions are being developed.

Accordingly, display apparatuses may be utilized to realize functions corresponding to various needs or intentions of consumers.

For example, there may be a user who wishes to see the scenery or wall behind the display apparatus that is covered by the display apparatus. Accordingly, a display apparatus including a transparent display panel is invented. In this case, the display may maintain the display panel in a transparent state except during reproduction of certain contents. In this case, a user may see scenery or a wall behind the display apparatus that is covered by the display apparatus.

Furthermore, it is necessary to develop a function satisfying a desire or an intention of the user by using a general display apparatus using an opaque display panel rather than a transparent display panel.

Also, in recent years, display apparatus products having picture frame-like shapes are being released. Such a display apparatus having a picture frame-like shape may display a certain screen image, e.g., a famous painting or a photograph, unless a user is viewing certain contents. In this case, the user may use and recognize the display apparatus as a framed famous painting or a large picture frame. Therefore, when a user wants a display apparatus that implements a picture frame function, it is necessary to additionally develop a display apparatus satisfying such an intention of the user and other functions to be applied thereto.

As described above, it is necessary to provide a display apparatus that satisfies needs and intentions of various users.

SUMMARY

Provided are an image processing method capable of adjusting a perspective or a depth of a displayed screen image as desired by a user and a display apparatus therefor.

In detail, provided are an image processing method for enabling a user to receive an impression of continuity or consistency between a displayed screen image and a wall behind a display apparatus and a display apparatus therefor.

Additional aspects will be set forth in part in the description which follows and, in part, will be apparent from the description, or may be learned by practice of the presented embodiments.

According to an aspect of an embodiment, a display apparatus includes a display; a communicator configured to communicating with an external device; a memory including one or more instructions; and a controller including at least one processor configured to execute the one or more instructions stored in the memory to obtain an image, obtain information about a first distance corresponding to a distance between a front surface of the display apparatus and a wall, and, when the image is displayed on the display, provide a shadow effect to at least one of four sides of the image based on the information about the first distance.

Also, the processor may execute the one or more instructions to adjust at least one of an area of a region in the image to which the shadow effect is applied and darkness of a shadow in the region to which the shadow effect is applied, based on the information about the first distance.

Also, the processor may execute the one or more instructions to adjust an intensity of the shadow effect to generate a depth impression of the image that corresponds to a depth impression of the wall behind the display apparatus.

Also, the display apparatus may further include a sensor for sensing a state of a light source. Also, the processor may execute the one or more instructions to apply the shadow effect on at least one of four sides of the image based on the state of the light source and the first distance.

Also, the sensor may include a plurality of illuminance sensors configured to sense an intensity and a direction of light from the light source. Also, the processor may execute the one or more instructions to adjust an intensity of the shadow effect applied to the image based on the information about the first distance, and the intensity and direction of the light from the light source.

Also, the processor may execute the one or more instructions to determine a thickness of a virtual picture frame as a first thickness based on the information about the first distance, apply the shadow effect in the virtual picture frame having the first thickness to the image, and display the image having applied thereto the shadow effect in the virtual picture frame having the first thickness.

Also, the processor may execute the one or more instructions to adjust at least one of an area of a region in the image to which the shadow effect is applied and darkness of a shadow in the region to which the shadow effect is applied, based on the first thickness.

The display apparatus may further include a user interface. Also, the processor may execute the one or more instructions to: display a user interface screen image for setting at least one of a color and a shape of the virtual picture frame, and; control the user interface to receive information about at least one of a color and a shape of the virtual picture frame from a user and display the image having applied thereto the shadow effect in the virtual picture frame having the color and shape according to the received information.

The display apparatus may further include a user interface configured to receiving a certain instruction or information. Also, the processor may execute the one or more instructions to display a user interface screen image for receiving information about the first distance and control the user interface to receive information about the first distance from a user.

The display apparatus may further include a user interface configured to receiving a certain instruction or information. Also, the processor may execute the one or more instructions to display a user interface screen image for receiving information about at least one window in a space in which the display apparatus is located for allowing light to be incident into a the space where the display apparatus is located.

Also, the processor may execute the one or more instructions to apply a shadow effect on at least one of four sides of the image based on information about the at least one window received via the user interface and based on information about the first distance.

The display apparatus may further include at least one sensor configured to sense a position of a user. Also, the processor may execute the one or more instructions to apply the shadow effect on at least one of four sides of the image based on the position of the user and based on the information about the first distance.

According to an aspect of another embodiment, a method by which a display apparatus processes an image, the method includes obtaining an image; obtaining information about a first distance corresponding to a distance between a front surface of the display apparatus and a wall; when the image is displayed on a display included in the display apparatus, applying a shadow effect on at least one of four sides of the image based on the information about the first distance; and displaying the image to which the shadow effect is applied.

Also, the applying of the shadow effect may include adjusting at least one of an area of a region in the image to which the shadow effect is applied and darkness of a shadow in the region to which the shadow effect is applied, based on the information about the first distance.

Also, the applying of the shadow effect may include adjusting an intensity of the shadow effect to generate a depth impression of the image that corresponds to a depth impression of the wall behind the display apparatus.

Also, the applying of the shadow effect may include applying the shadow effect to at least one of the four sides of the image based on the information about the first distance and based on a state of a light source sensed by using a plurality of illuminance sensors included in the display apparatus.

Also, the applying of the shadow effect may include determining a thickness of a virtual picture frame as a first thickness based on the information about the first distance, applying the shadow effect in the virtual picture frame having the first thickness to the image, and displaying the image to which the shadow effect is applied in the virtual picture frame having the first thickness.

The image processing method may further include displaying a user interface screen image for setting at least one of a color and a shape of the virtual picture frame, receiving information about the at least one of a color and a shape of the virtual picture frame, and displaying the image having applied thereto the shadow effect in the virtual picture frame having the at least one of color and shape according to the received information.

Also, the applying of the shadow effect may include applying the shadow effect to at least one of the four sides of the image based on the information about the first distance and based on a position of the user sensed by using at least one sensor configured to sense the position of the user.

According to an aspect of another embodiment, there is provided a non-transitory computer readable recording medium having recorded thereon a computer program including instructions executable by a computer, wherein the program including obtaining an image; obtaining information about a first distance corresponding to a distance between a front surface of a display apparatus and a wall; when the image is displayed on a display included in the display apparatus, applying a shadow effect on at least one of four sides of the image based on the information about the first distance; and displaying the image to which the shadow effect is applied.

According to an aspect of another embodiment, there is provided A display apparatus comprising a display that displays, on a front surface thereof, an image corresponding to a wall located behind the display apparatus opposite from the front surface;

a memory storing one or more instructions; and at least one processor configured to execute the one or more instructions stored in the memory to obtain information about a first distance corresponding to a distance between the front surface and the wall, apply a shadow effect to one or more sides of the image based on the information about the first distance to generate a shadow effect image, and display the shadow effect image.

Also, the information about the first distance may be the distance between the front surface and the wall.

Also, the distance may include a thickness of the display apparatus and a thickness of a wall mount to which the display apparatus is mounted.

Also, the distance may include a thickness of the display apparatus and a length of a stand on which the display apparatus is mounted.

Also, the distance may further comprise a distance between the stand and the wall.

BRIEF DESCRIPTION OF THE DRAWINGS

These and/or other aspects will become apparent and more readily appreciated from the following description of the embodiments, taken in conjunction with the accompanying drawings in which:

FIG. 18 is a flowchart of an image processing method according to an embodiment.

DETAILED DESCRIPTION

Figure 1:
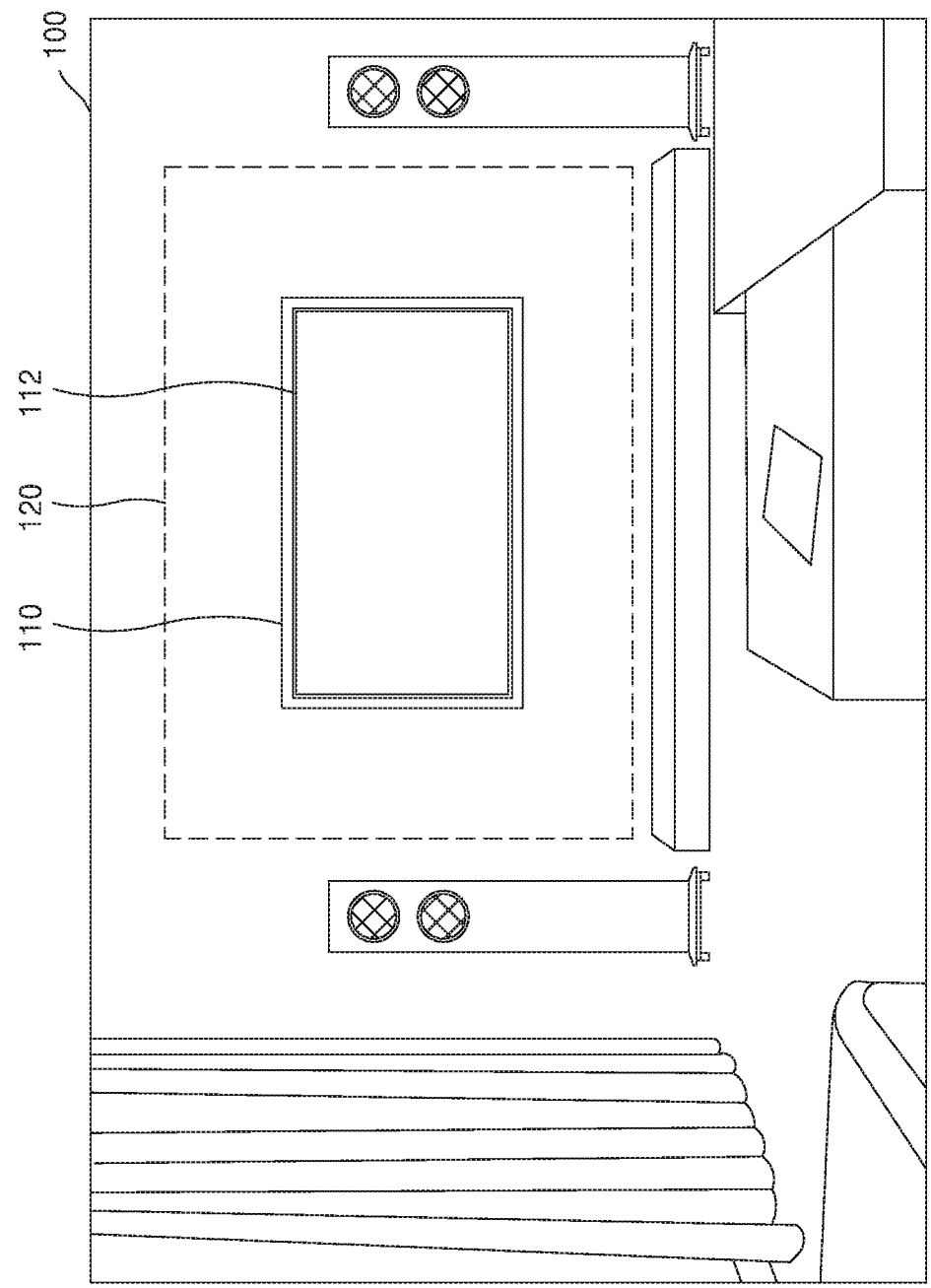
FIG. 1 is a diagram showing a space where a display apparatus is placed.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure will be described in detail with reference to the accompanying drawings. The disclosure may, however, be embodied in many different forms and should not be construed as limited to the embodiments set forth herein. In order to clearly illustrate the disclosure, parts not related to the description are omitted, and like parts are denoted by like reference numerals throughout the specification.

Throughout the specification, it will be understood that when a portion is referred to as being "connected to" another portion, it can be "directly connected to" the other portion or "electrically connected to" the other portion via another element. In addition, unless explicitly described to the contrary, the word "comprise" and variations such as "comprises" or "comprising" will be understood to imply the inclusion of stated elements but not the exclusion of any other elements.

Appearances of the phrases 'in some embodiments,' 'in certain embodiments,' in various embodiments,' and similar language throughout this specification may, but do not necessarily, all refer to the same embodiment, but mean 'one or more but not all embodiments' unless expressly specified otherwise.

Some embodiments may be described in terms of functional block components and various processing steps. Such functional blocks may be realized by any number of hardware and/or software components configured to perform the specified functions. For example, the functional blocks of the disclosure may be implemented with one or more processors or microprocessors or circuit configurations for certain functions. Also, the functional blocks of the disclosure may be implemented with any programming or scripting language. Functional blocks may be implemented in algorithms that are executed on one or more processors. Furthermore, the disclosure may employ any number of conventional techniques for electronics configuration, signal processing, and/or data processing. The words "module", "component", "means", and "configuration" are used broadly and are not limited to mechanical or physical embodiment.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Hereinafter, the disclosure will be described in detail with reference to accompanying drawings.

FIG. 1 is a diagram showing a space in which a display apparatus is placed.

Referring to FIG. 1, a display apparatus 110 may be placed in a certain space 100. Here, the display apparatus 110 is an electronic apparatus that outputs an image through a screen 112. In detail, the display apparatus 110 is an apparatus for visually outputting contents, advertisements, guide information, or user interface screen images to a user and may be in various forms like a TV, a digital broadcasting terminal, etc. Furthermore, the display apparatus 110 may have be in a mobile form or a portable form as well as a stationary form.

As shown in FIG. 1, the display apparatus 110 may be a wall-mount type display apparatus that may be attached to and detached from a wall and may be mounted on a wall 120.

There may be a user who wishes to see scenery or a wall portion behind the display apparatus 110 that is covered by the display apparatus 110. As in the example shown in FIG. 1, there may be a user who wishes to see a portion of the wall 120 covered by the display apparatus 110.

In this case, the display apparatus 110 may output an image of the wall 120 on the screen 112. As a result, the user may enjoy a visual effect that the display apparatus 110 became a transparent window.

Although FIG. 1 exemplifies a case where the wall 120 is a wall having wallpaper attached thereto (see, for example, discussion below with reference to FIGS. 2A-2B), the wall 120 may be a transparent wall via which an outside landscape may be seen, e.g., a glass wall or a glass window. When the wall 120 is a transparent wall, the display apparatus 110 may display an image of an outside landscape, which is visible through the wall 120, on the screen 112.

Figure 2A:
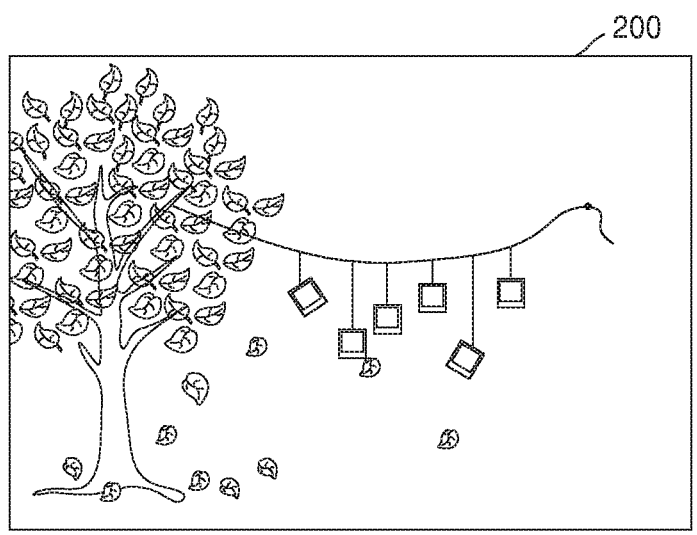
FIG. 2A is a diagram showing a wall of the space shown in FIG. 1 in more detail.

FIG. 2A is a diagram showing the wall 120 shown in FIG. 1 in more detail.

Referring to FIG. 2A, a region 200 is a region corresponding to the wall 120 shown in FIG. 1 and includes a portion to be covered by the display apparatus 110.

Hereinafter, a case in which a wall having certain wallpaper attached thereto is behind the display apparatus 110 as shown in FIG. 2A will be exemplified and described. Therefore, the portion covered by the display apparatus 110 may be a portion of the wallpaper attached to the wall 120.

Furthermore, FIG. 2A shows that wallpaper having a certain pattern is attached to the wall 120. However, the wall 120 behind the display apparatus 110 may be a wall having wallpaper without a pattern attached thereto or may be a wall having one of various other shapes and patterns. Furthermore, the wall 120 behind the display apparatus 110 may be a transparent wall like a glass wall or a window, through which an outside landscape is visible.

Figure 2B:
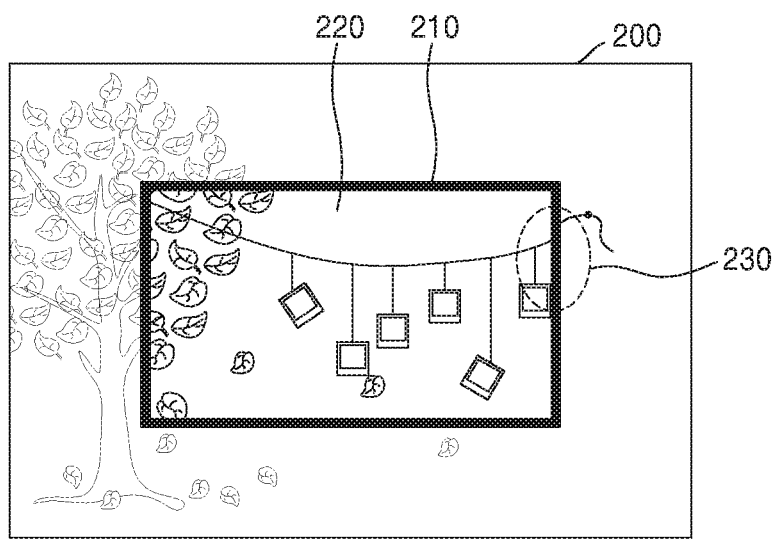
FIG. 2B is a diagram showing a display apparatus on a region of the wall shown in FIG. 2.

FIG. 2B is a diagram showing a display apparatus on the region 200 of the wall shown in FIG. 2.

Referring to FIG. 2B, a display apparatus 210 is disposed on the region 200. Here, the display apparatus 210 is placed by being attached onto a wall. The display apparatus 210 may display an image of a portion of the region 200 (wall) corresponding to a screen 220, which is displayed via a display of the display apparatus 210, on the screen 220. Alternatively, the display apparatus 210 may display a portion of the region 200 (wall) covered by the display apparatus 210 on the screen 220.

The display apparatus 210 captures an image of the region 200 (wall) and displays a portion of the image corresponding to the screen 220 of the display apparatus 210 on the screen 220 as-is. Generally, the display apparatus 210 has a certain thickness and a component for attaching the display apparatus 210 to a wall, e.g., a wall mount, also has a certain thickness. Therefore, the screen 220 is located in front of the wall.

Referring to FIG. 2B, the screen 220 is in front of the region 200 (wall). Therefore, when a user in the front of the display apparatus 210 views the display apparatus 210, an image displayed on the screen 220 has a smaller depth than that of a wall, and thus the user recognizes the image of the wall displayed on the screen 220 as being closer to the user than the actual wall. Therefore, as in a blocked portion 230, the user recognizes that the screen 220 and the wall are inconsistent due to a difference in depth. Therefore, even when the display apparatus 210 displays an image of the wall on the screen 220, the user may not get an impression of continuity or consistency with the actual wall.

Hereinafter, an image processing method and a display apparatus therefor according to an embodiment, the image processing method and the display apparatus capable of providing consistency or continuity between a surface behind the display apparatus 210 (e.g., a wall) and an image displayed on the display apparatus 210 in a case where the display apparatus 210 displays an image corresponding to the surface behind the display apparatus 210 will be described in detail with reference to the attached drawings.

Figure 3:
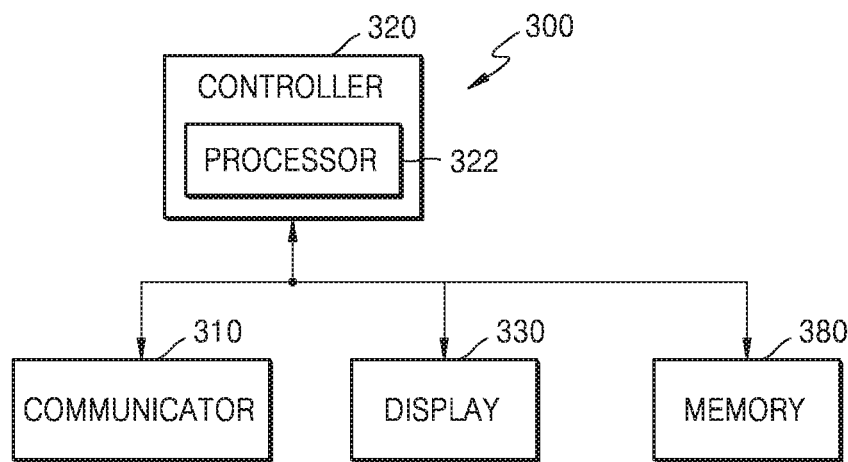
FIG. 3 is a block diagram showing a display apparatus according to an embodiment.

FIG. 3 is a block diagram showing a display apparatus according to an embodiment of the disclosure.

Referring to FIG. 3, a display apparatus 300 according to an embodiment includes a communicator 310, a controller 320, and a display 330.

The display apparatus 300 includes the display 330, the communicator 310 that communicates with an external device (not shown), a memory 380 that stores one or more instructions, and the controller 320 that includes a processor 322 for carrying out the one or more instructions stored in the memory 380.

The controller 320 obtains an image. For example, the controller 320 receives an image from an external device (not shown). The controller 320 obtains information about a first distance corresponding to a distance between the front surface of the display apparatus 300 and a wall, and, when the image obtained from the external device is displayed, controls the display apparatus 300 to provide a shadow effect on at least one of four sides of the image based on the information about the first distance.

Here, the 'information about the first distance' may include the distance between the front surface of the display apparatus 300 and the wall. Alternatively, the 'information about the first distance' may include information having a value proportional to the distance between the front surface of the display apparatus 300 and the wall. Alternatively, the 'information about the first distance' may include at least one of a mathematical expression or a calculation method capable of calculating the first distance, which is a distance between the front surface of the display apparatus 300 and the wall, and values used in the mathematical expression or the calculation method. Alternatively, the 'information about the first distance' may include all relevant information for obtaining the distance between the front surface of the display apparatus 300 and the wall.

Hereinafter, a case in which the 'information about the first distance' includes the first distance, which is the distance between the front surface of the display apparatus 300 and the wall, will be described.

In other words, the controller 320 may receive an image from an external device (not shown), obtain the first distance, which is a distance between the front surface of the display apparatus 300 and a wall, and, when the image obtained from the external device is displayed on the display 330, control the display apparatus 300 to provide a shadow effect on at least one of four sides of the image based on the first distance. In detail, at least one processor 322 included in the controller 320 may receive an image from an external device (not shown), obtain the first distance, which is a distance between the front surface of the display apparatus 300 and a wall, and, when the image obtained from the external device is displayed on the display 330, control the display apparatus 300 to provide a shadow effect on at least one of four sides of the image based on the first distance.

Furthermore, in some embodiments, the memory 380 may be embedded in the controller 320. Therefore, the controller 320 may include the memory 380 and at least one processor 322 to control operations performed in the display apparatus 300 and may control other components included in the display apparatus 300 to perform certain operations. In detail, the processor 322 included in the controller 320 may execute at least one instruction stored in the memory 380, which is embedded in the controller 320, to perform a certain operation.

Also, according to an embodiment, the at least one processor 322 included in the controller 320 may control operations performed in the display apparatus 300 and control other components included in the display apparatus 300 to perform certain operations. Accordingly, although a case in which the controller 320 controls to perform certain operations is described, at least one processor 322 included in the controller 320 may control to perform the certain operations.

In detail, the communicator 310 may receive an image of a wall behind the display apparatus 300. Hereinafter, an image obtained by capturing an image of a wall behind the display apparatus 300 will be referred to as a 'first image'. Here, the 'first image' may be an image of a portion of a wall covered by the display apparatus 300. In detail, the first image may be an image of a region of the wall corresponding to a screen of the display apparatus 300.

Also, the wall may be a transparent wall (e.g., a glass window) or an opaque wall (e.g., a wall having wallpaper attached thereto, or a painted wall, etc.). When the wall is a glass window, the first image may be an image of an outside landscape that is covered by the display apparatus 300. Furthermore, when the wall is a wall having wallpaper attached thereto, the first image may be an image of a portion of the wallpaper covered by the display apparatus 300. Furthermore, when the wall is a wall that is painted, the first image may be an image of a portion of the painted call covered by the display apparatus 300.

In detail, the communicator 310 may receive a video (e.g., a moving picture), an audio (e.g., a voice, a music, etc.), and/or additional information (e.g., an EPG). In detail, the communicator 310 may include one from among a high-definition multimedia interface (HDMI) port (not shown), a component jack (not shown), a PC port (not shown), and a USB port (not shown). Also, the communicator 310 may include a combination of an HDMI port, a component jack, a PC port, and a USB port. Although this is only an example, and the communicator 310 is not particularly limited, as long as the communicator 310 is capable of transmitting information for display to the display apparatus 300. For example, the communicator 310 may, in some embodiments, include one or more of the HDMI port, the component jack, the PC port, and the USB port.

In this case, the communicator 310 may directly receive video data obtained by a user by photographing a portion of a wall covered by the display apparatus 300 through the HDMI port, the component jack, the PC port, or the USB port.

Furthermore, the communicator 310 may include at least one communication module (not shown) that transmits and receives data through a wired/wireless communication network according to a certain communication standard. In this case, the communicator 310 may receive the first image through the communication module. For example, a user may obtain the first image by capturing an image of a wall by using a smartphone (not shown) of the user and transmit the first image to the display apparatus 300 through a Wi-Fi communication network. In the above example, the communicator 310 may include a Wi-Fi communication module (not shown) and may receive the first image from the smartphone of the user via the Wi-Fi communication module included in the communicator 310.

The controller 320 obtains information about the first distance.

In detail, the controller 320 may obtain the first distance, which is a distance between the front surface of the display apparatus 300 and the wall, as information about the first distance. In detail, the at least one processor 322 included in controller 320 may obtain the first distance. The controller 320 may apply a shadow effect to the first image based on the first distance, such that a shadow appears on at least one of four sides of the first image. Hereinafter, an image generated by applying a shadow effect to the first image will be referred to as a 'second image'.

The display 330 displays the second image. In detail, the display 330 may display the second image on a screen thereof.

In detail, the display 330 may display an image corresponding to video data through a display panel included in the display 330, such that a user may visually recognize the video data.

Furthermore, based on whether a display surface (e.g., a display panel) for displaying a screen image has a curvature, the display 330 may be categorized as a flat-panel display without a curvature and a curved display in which a display panel is curved to a certain curvature. The display 330 may include various types of display panels corresponding to various light-emitting devices, e.g., an OLED panel, an LED panel, an LCD panel, or a PDP panel.

In detail, the controller 320 may apply a shadow effect to the first image, such that a user may recognize the second image with a same depth as that of a wall behind the display apparatus 300. In other words, when the display apparatus 300 displays an image corresponding to a wall behind the display apparatus 300 on the display 330, the controller 320 may generate the second image by applying a shadow effect to the first image, such that a user may recognize the second image displayed on the display 330 as being consistent and continuous to the wall.

In detail, the controller 320 of the display apparatus 300 may adjust a depth applied to a screen image displayed on the display apparatus 300, such that the screen image of the display apparatus 300 is recognized as having a same depth impression as that of a wall behind the display apparatus 300. In detail, at least one of an amount of a shadow applied to an image displayed on a screen (e.g., a width and/or a thickness of a region in which the shadow is expressed) and a quality (e.g., the darkness of the shadow) may be adjusted.

Accordingly, a user recognizes that the second image, which is the image of the wall displayed on the display apparatus 300, has the same depth impression as that of the wall behind the display apparatus 300, and thus the user may feel continuity and consistency.

Furthermore, the controller 320 may adjust the magnification of the image displayed on the screen of the display apparatus 300, such that the user recognizes the second image displayed on the display apparatus 300 as being more consistent to the wall behind the display apparatus 300. In detail, referring to FIG. 2B, when a user is positioned in front of the display apparatus 210, the screen 220 of the display apparatus 210 is closer to the user than the region 200 (wall) is. As a result, the pattern of wallpaper in an image displayed on the screen 220 is seen as being larger than the actual pattern of the wallpaper in the region 200 (wall). Accordingly, the magnification of the image displayed on the screen 220 may be adjusted, such that the pattern of the wallpaper in the image displayed on the screen 220 has a same size as that of the actual pattern in the region 200 (wall). As a result, the discontinuity of the pattern of the wallpaper as in the blocked portion 230 is eliminated, and thus a user may recognize that the screen 220 of the display apparatus 210 as being more consistent to the actual wall.

Figure 4:
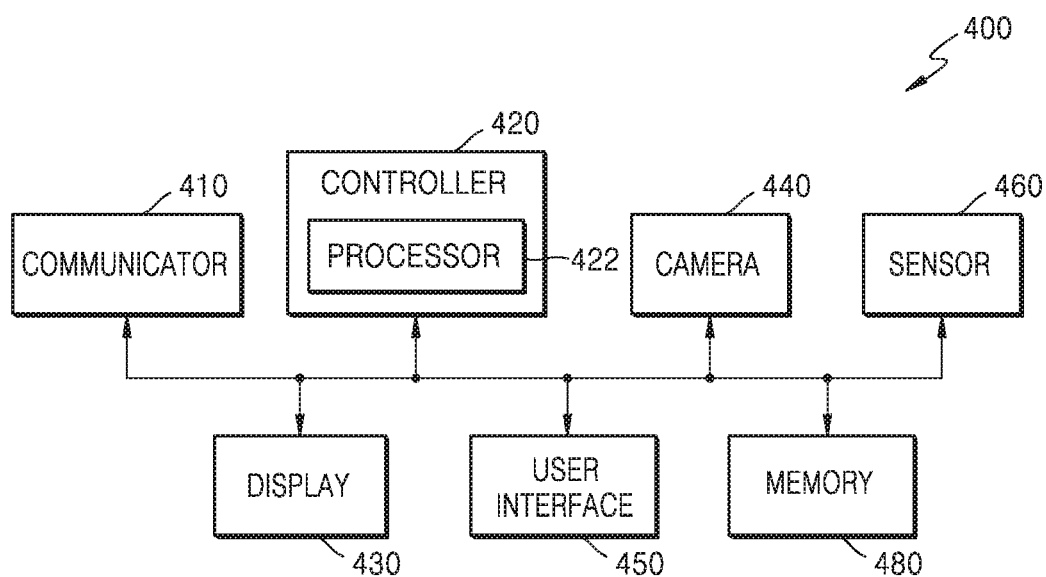
FIG. 4 is a block diagram showing a display apparatus according to an embodiment.

FIG. 4 is a block diagram showing a display apparatus according to an embodiment.

A display apparatus 400 shown in FIG. 4 corresponds to the display apparatus 300 shown in FIG. 3. In detail, a communicator 410, a controller 420, a processor 422, a display 430, and a memory 480 included in the display apparatus 400 correspond to the communicator 310, the controller 320, the processor 322, the display 330, and the memory 380 included in the display apparatus 300, respectively. Therefore, descriptions of the display apparatus 400 identical to the descriptions given above with those in FIGS. 1 to 3 will be omitted. Compared to the display apparatus 300 shown in FIG. 3, the display apparatus 400 shown in FIG. 4 may further include at least one of a camera 440, a user interface 450, a sensor 460, and the communicator 410.

The display apparatus 400 includes the display 430, the communicator 410 that communicates with an external device (not shown), a memory 480 that includes one or more instructions, and the controller 420 that includes the processor 422 for carrying out the one or more instructions stored in the memory 480.

The communicator 410 communicates with an external device (not shown).

In detail, the communicator 410 communicates with an external device (not shown) and obtains a first image, which is an image obtained by photographing a wall behind the display apparatus 400. Here, the 'first image' may be an image of a portion of a wall covered by the display apparatus 400. In detail, the first image may be an image of a region of the wall corresponding to a screen of the display apparatus 400.

The controller 420 obtains a first distance, which is a distance between the front surface of the display apparatus 400 and the wall. Next, a second image is generated by applying a shadow effect to the first image based on the first distance, such that a shadow appears on at least one of four sides of the first image. In detail, the controller 420 may receive an image from an external device (not shown), obtain the first distance, which is a distance between the front surface of the display apparatus 400 and a wall, and, when the image obtained from the external device is displayed on the display 430, control the display apparatus 400 to provide a shadow effect on at least one of four sides of the image based on the first distance.

The display 430 displays the second image.

In the display apparatus 400, the controller 420 may control the overall operation of the display apparatus 400.

In detail, the controller 420 controls the overall operation of the display apparatus 400 and the signal flow between the internal components of the display apparatus 400 and performs data processing.

According to an embodiment, the controller 420 may control the communicator 410 and other components including the communicator 410 to perform an operation for obtaining the first image, an operation for applying a shadow effect to the first image, and an operation for generating the second image.

Furthermore, the controller 420 may include a memory storing one or more programs for performing the operations described above and operations described below and at least one processor 422 for executing the at least one program stored in the memory.

In detail, the controller 420 may include a RAM (not shown), which stores signals or data input from the outside of the display apparatus 400 or is used as a storage space corresponding to various operations performed in the display apparatus 400, a ROM (not shown) in which a control program for controlling the display apparatus 400 is stored, and at least one processor.

The at least one processor 422 may include a graphic processing unit (GPU) (not shown) for graphics processing corresponding to a video. The at least one processor 422 may be implemented as a System On Chip (SoC) in which a core (not shown) and a GPU (not shown) are integrated with each other. The at least one processor 422 may include a single core, dual cores, triple cores, quad cores, and cores of multiples thereof.

The user interface 450 may receive a user input for controlling the display apparatus 400. The user interface 450 may include user input devices like a touch panel for sensing a touch of a user, a button for receiving a push operation of the user, a wheel for receiving a rotation operation of the user, a keyboard, and a dome switch. However, the user interface 450 is not limited thereto.

According to an embodiment, the user interface 450 may receive information about the first distance from a user. In detail, the user may directly input the distance between the front surface of a display apparatus and a wall behind the display apparatus (the first distance) through the user interface 450.

Also, when a user interface screen image for setting the first distance is displayed according to a control of the controller 420, the user may operate a first distance setting menu of the user interface screen image through the user interface 450. Therefore, the controller 420 may set the first distance based on the operation of the user. The user interface screen image for setting the first distance will be described below in detail with reference to FIGS. 14A and 14B.

Once information about the first distance is obtained, the controller 420 may adjust the intensity of a shadow effect to be proportional to the first distance, thereby creating the second image.

In detail, the controller 420 may adjust at least one of the area of a region of the first image to which the shadow effect is applied and the darkness of the shadow in the region to which the shadow effect is applied, based on information about the first distance.

In detail, the controller 420 may adjust the intensity of the shadow effect to be proportional to the first distance, thereby creating the second image. Here, the intensity of the shadow effect may vary according to at least one of an amount of a shadow applied to an image displayed on a screen (e.g., a width and/or a thickness of a region in which the shadow is expressed) and a quality (e.g., the darkness of the shadow).

The communicator 410 may communicate with an external electronic device (not shown) or a server (not shown) via a wire communication or a wireless communication. Hereinafter, the external electronic device (not shown) and the server (not shown) communicating with the communicator 410 will be referred to as an "external device" altogether. The communicator 410 according to an embodiment includes at least one communication module like a short-range communication module, a wire communication module, a mobile communication module, and a broadcast receiving module. Here, the at least one communication module refers to a communication module capable of transmitting and receiving data through a network complying with a communication standard like Bluetooth, WLAN (Wi-Fi), wireless broadband (Wibro), world Interoperability for microwave access (Wimax), CDMA, and WCDMA.

According to an embodiment, the communicator 410 may receive information about the first distance from an external electronic device (not shown), e.g., a mobile phone of a user using the display apparatus 400. The communicator 410 may also receive the first image from an external electronic device (not shown), e.g., a mobile phone of a user using the display apparatus 400.

The memory 480 may include at least one of certain data and programs including instructions for performing certain operation. Furthermore, the memory 480 may include at least one controller (not shown) for executing a certain program.

Furthermore, the memory 480 may store video data to be output to the display 330.

In detail, the memory 480 may include at least one type of storage medium from among a flash memory, a hard disk, a multimedia card micro type, a card type memory (e.g., an SD memory or an XD memory), a random access memory (RAM), a static random access memory (SRAM), a read only memory (ROM), an electrically erasable programmable read-only memory (EEPROM), a programmable read-only memory (PROM), a magnetic memory, a magnetic disk, and an optical disk.

According to an embodiment, the memory 480 may store at least one program including instructions for performing the above-described operations. Alternatively, memory 480 may include at least one controller that executes a program including instructions for performing the above-described operations.

According to an embodiment, the memory 480 may store at least one of the first distance, the first image, and the second image.

The sensor 460 may sense a state of a light source. Furthermore, the controller 420 may generate the second image by applying a shadow effect to the first image based on the state of the light source sensed by the sensor 460 and the first distance. In detail, the controller 420 may adjust the intensity of the shadow effect based on the state of the light source and the first distance. Then, the second image may be generated by applying the shadow effect having the adjusted intensity to the first image.

In detail, the sensor 460 may include a plurality of illuminance sensors. Accordingly, the controller 420 may generate the second image by applying a shadow effect to the first image based on the state of the light source detected by the illuminance sensors and first distance. Here, the illuminance sensors may sense at least one of direction of incidence of light and intensity of light.

The illuminance sensors included in the sensor 460 will be described below in detail with reference to FIGS. 9A and 9B.

The camera 440 may obtain an image by photographing at least one of a front surface and a rear surface behind of the display apparatus 400. According to an embodiment, the camera 440 may photograph a surface behind the display apparatus 400, thereby obtaining obtain the first image, which is an image corresponding to a portion of a wall covered by the display apparatus 400. The camera 440 may transmit the first image to the controller 420. The controller 420 may apply a shadow effect to the first image.

Details of operations performed in the display apparatus 400 will be described below with reference to FIGS. 5A to 16.

Figure 5A:
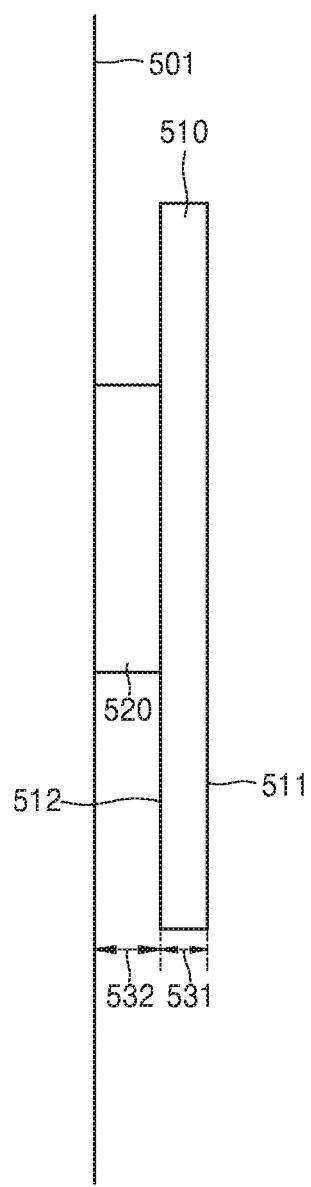
FIGS. 5A and 5B are diagrams for describing a first distance obtained with respect to a wall-mount type display apparatus.
Figure 5B:
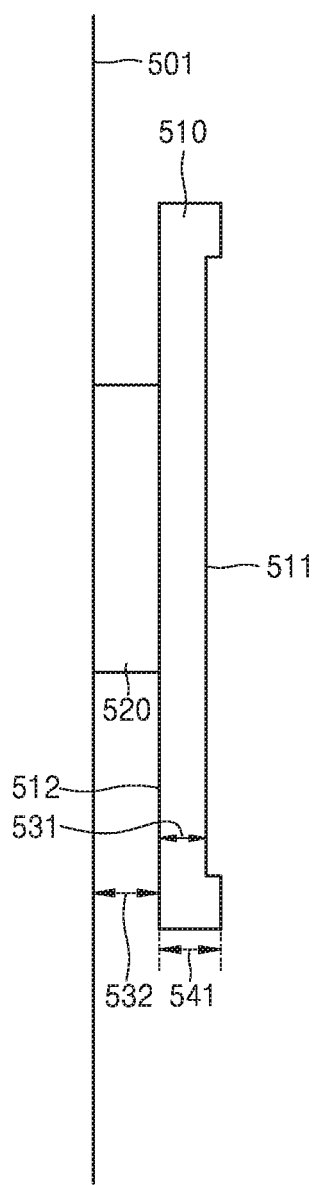

FIGS. 5A and 5B are diagrams for describing a first distance obtained with respect to a wall-mount type display apparatus. In FIGS. 5A and 5B, a display apparatus 510 corresponds to the display apparatus 400 shown in FIG. 4, and thus descriptions identical to those given above with reference to FIGS. 1 to 4 will be omitted.

Here, the wall-mount type display apparatus refers to a display apparatus fixedly placed by being attached to a wall. A component for attaching and fixing a display apparatus to a wall is referred to as a wall mount 520.

Referring to FIG. 5A, the display apparatus 510 includes the wall mount 520 and is attached and fixed to a wall 501 through the wall mount 520.

A distance between the wall 501 and a screen 511, which is a surface for displaying a screen image, of the display apparatus 510 (e.g., a vertical distance or the shortest distance) may be a sum of a thickness 531 of the display apparatus 510 and a thickness 532 of the wall mount 520.

Therefore, the first distance, which is a distance between the wall 501 behind the display apparatus 510 and the screen 511 of the display apparatus 510, may be a sum of the thickness 531 and the thickness 532.

As shown in FIG. 5B, the display apparatus 510 may have a shape that a border is attached to edges of the screen 511. In detail, in the case of a frame TV, a border having a picture frame-like shape is attached to edges of the screen 511. In this case, the border having a picture frame-like shape is formed to protrude forward from the screen 511 as shown in FIG. 5B.

At this time, a thickness 541 including the border is not considered for measuring the first distance. Therefore, regardless of the shape of the display apparatus, the first distance may be measured as the shortest distance between the screen 511 and the wall 501.

As shown in FIGS. 5A and 5B, when the display apparatus 510 displays an image of the wall 501 on the screen 511 (e.g., an image of wallpaper attached to the wall 501), the image is projected forward by a sum of a first thickness, that is, a sum of the thickness 531 and the thickness 532, from the wall 501.

In the case of a display apparatus 510 (wall-mount type), the first distance, which is the distance between the screen 511 and the wall 501, is a fixed value. In detail, the first distance is a sum of the thickness 531 of the display apparatus 510 and the thickness 532 of the wall mount. In other words, a user is unable to change the arrangement of the display apparatus 510 or the first distance even when the user wants to.

Therefore, in the case of the display apparatus 510 (wall-mount type), the first distance may be provided by a manufacturer, a retailer, and a related service provider of the display apparatus 510.

In detail, the first distance may be input or received via the communicator 410 of display apparatus 510. Alternatively, the first distance may be stored in the controller 420 or in the memory 480 of the display apparatus 510 in advance.

For example, a server managed by the manufacturer of the display apparatus 510 (e.g., a service center server of the display apparatus 510) may provide information about the first distance. The display apparatus 510 may then access a server or a device providing information about the first distance and obtain the first distance.

For example, the display apparatus 510 may obtain the first distance through the communicator 410 before the display apparatus obtains or displays the first image. In detail, the controller 420 may access the service center server of the display apparatus 510 through a Wi-Fi network and obtain the first distance.

Alternatively, the display apparatus 510 may store information about the first distance in at least one of the controller 420 and the memory 480. As described above, since the first distance is a fixed value according to the product specification of the display apparatus 510, the display apparatus 510 may store the first distance as information about the product specification.

Also, the display apparatus 510 may store product information like a product model, a serial number, a product version, etc. The controller 420 of the display apparatus 510 may obtain the first distance by using product information stored in the display apparatus 510. For example, the controller 420 may access the service center server of the display apparatus 510 through the communicator 410 and transmit product information to the service center server. Then, the service center server may transmit information about the first distance corresponding to the product information of the display apparatus 510 to the display apparatus 510 in response thereto.

Figure 5C:
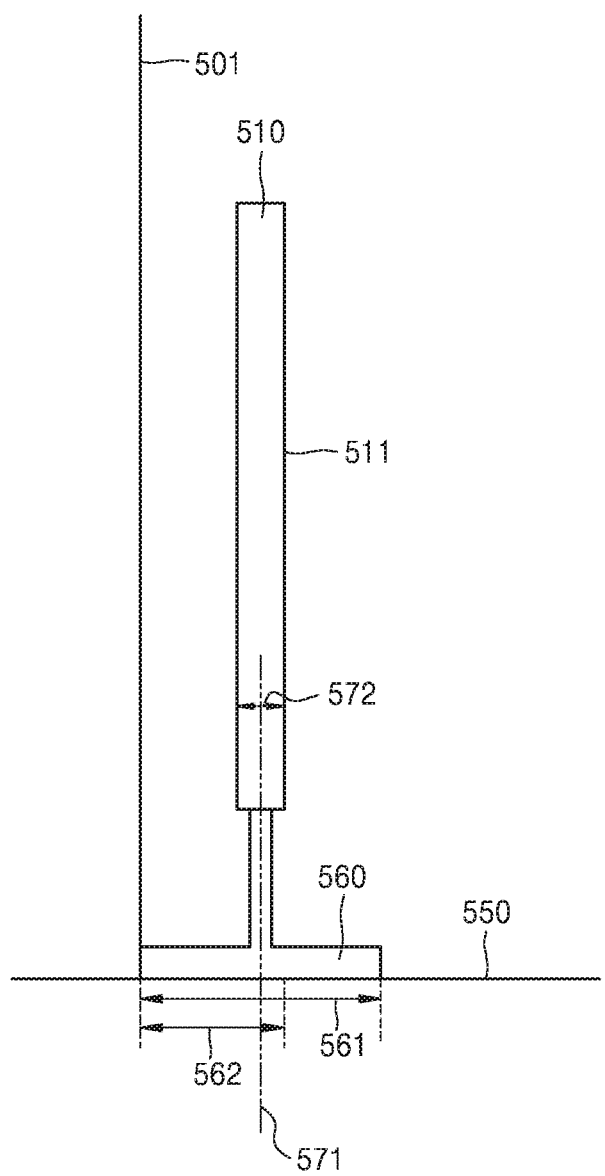
FIGS. 5C and 5D are diagrams for describing a first distance obtained with respect to a stand-type display apparatus.
Figure 5D:
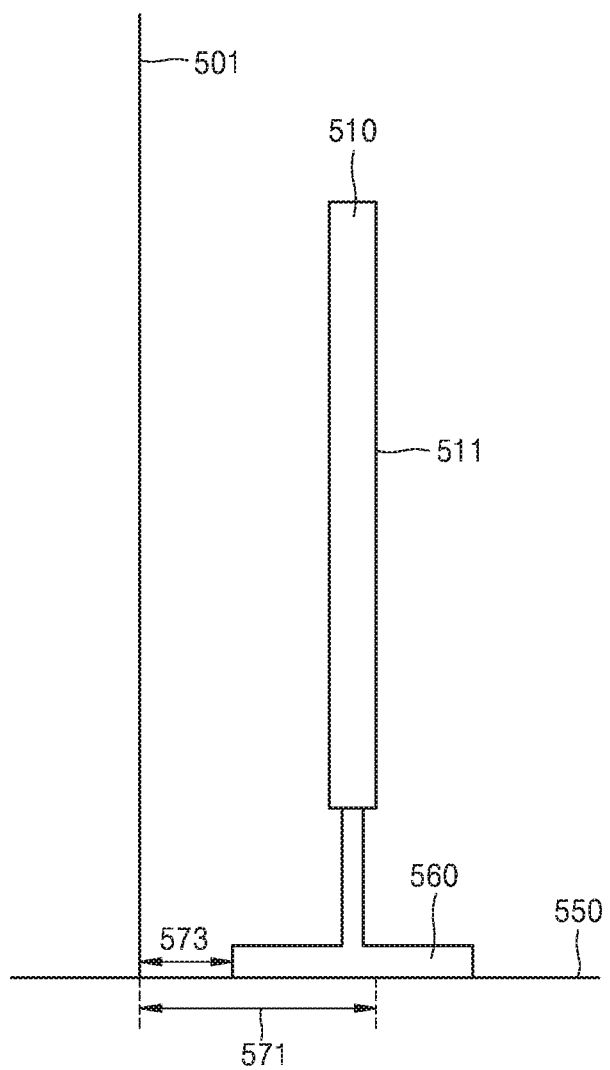

FIGS. 5C and 5D are diagrams for describing a first distance obtained in a stand-type display apparatus. Components shown in FIGS. 5C and 5D identical to those in FIGS. 5A and 5B are denoted by the same reference numerals.

Here, the stand-type display apparatus refers to a display apparatus arranged as shown in FIGS. 5C and 5D using a stand 560 supported on a bottom surface 550.

In FIG. 5C, for placing the display apparatus 510, the stand 560 may be arranged to be as close to the wall 501 as possible.

In this case, a distance between the screen 511 of the display apparatus 510 and the wall 501 may be measured in consideration of a length of the stand 560 and a thickness 572 of the display apparatus 510. For example, since a center line of the display apparatus 510 is also a center line of the stand 560, a first distance 562 may be obtained by adding a value obtained by dividing a first thickness 561 of the stand 560 by 2 to a value obtained by dividing the thickness 572 by 2.

Referring to FIG. 5D, for placing the display apparatus 510, the stand 560 may be disposed, such that the display apparatus 510 is not in close contact with the wall 501.

In this case, a distance between the screen 511 of the display apparatus 510 and the wall 501 may be measured based on the first thickness 561 described above with reference to FIG. 5C and a distance 573 between the stand 560 and the wall 501.

Accordingly, the first distance 571 in case where the display apparatus 510 is arranged as shown in FIG. 5D may be measured as an actual straight distance between the wall 501 and the screen 511, as shown in FIG. 5D.

As shown in FIG. 5C, when the display apparatus 510 is arranged in close contact with the wall 501, the first distance may be a fixed value according to the product specification of the display apparatus 510, and more particularly, a size or a thickness of the stand 560. In such a case, the first distance may be obtained in the same manner as the method for obtaining the first distance in the display apparatus 510 (wall-mount type) shown in FIGS. 5A and 5B.

As shown in FIG. 5D, when the display apparatus 510 is arranged to not to be in close contact with the wall 501, the display apparatus 510 may receive the first distance from a user. For example, the display apparatus 510 may display a user interface screen image for setting the first distance, and the user may input or set the first distance through the displayed user interface screen image.

Hereinafter, a shadow effect applied to a first image based on a first distance will be described in detail with reference to FIGS. 6A and 6B.

In detail, the controller 420 may generate a second image by applying a shadow effect to a first image, such that a shadow appears on at least one of four sides of the first image based on the first distance. In detail, the intensity of the shadow effect may be adjusted to be proportional to the first distance.

Figure 6A:
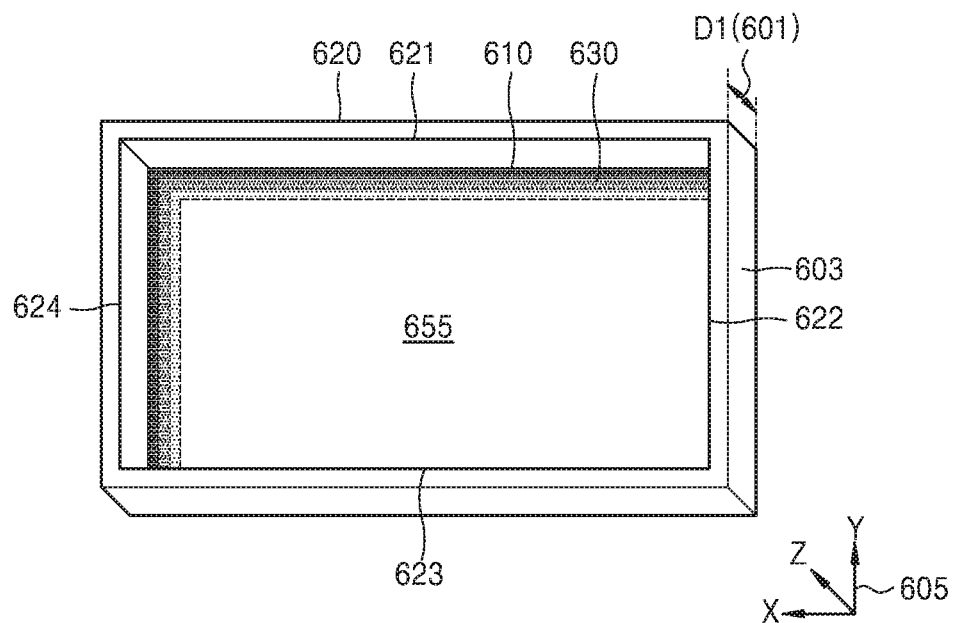
FIG. 6A is a diagram for describing a shadow effect applied in a display apparatus according to an embodiment.

FIG. 6A is a diagram for describing a shadow effect applied in a display apparatus according to an embodiment.

FIG. 6A shows a second image 655 having applied thereto a shadow effect 630, which is applied when a first distance 601 has a value of 'D1'.

Referring to a shown coordinate 605, a wall is located on an X-Y plane having a Z value of 0, and a screen image of the display apparatus 400 is displayed on an X-Y plane having a Z value of D1. In other words, a plane 610 may be the position of the wall, and a plane 620 may be the position of the screen image.

In detail, when the first distance 601 has a value of D1, the display apparatus 400 may generate the second image 655 by applying a shadow effect having an intensity proportional to the first distance 601 to a first image, such that a user may recognize that a screen image displayed on the plane 620 is displayed on the plane 610.

Here, the intensity of the shadow effect may be adjusted according to at least one of the size and the thickness of a region in which a shadow is displayed and a color, a darkness, or a gray level of the shadow in the region in which the shadow is displayed.

Figure 6B:
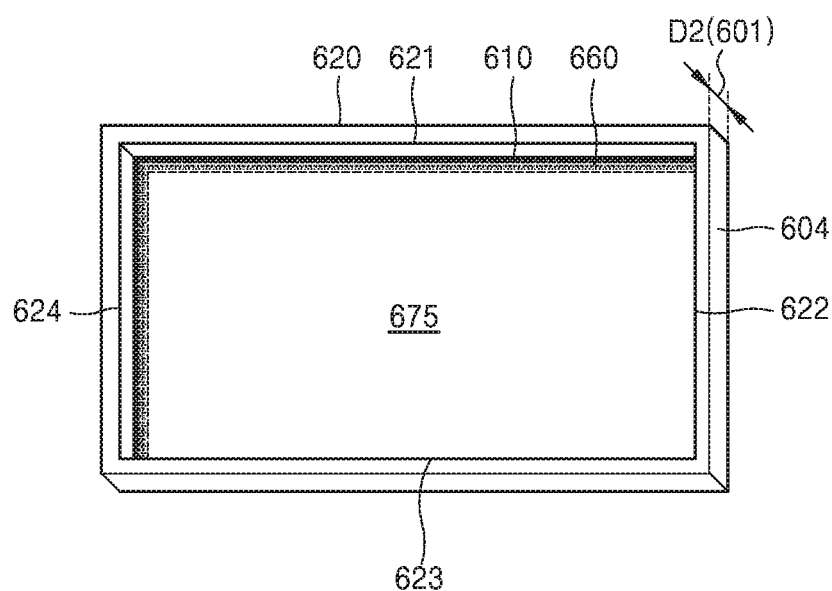
FIG. 6B is a diagram for describing a shadow effect applied in a display apparatus according to an embodiment.

FIG. 6B is a diagram for describing a shadow effect applied in a display apparatus according to an embodiment of the disclosure.

FIG. 6B shows a second image 675 having applied thereto a shadow effect 660, which is applied when the first distance 601 has a value of 'D2'. In FIG. 6B, components identical to those shown in FIG. 6A are denoted by the same reference numerals. Also, D2 is a value smaller than D1.

In detail, the greater the first distance 601 is, the greater the size or thickness of the region in which the shadow is displayed may become. Alternatively, the greater the first distance 601 is, the higher the gray level in the region where the shadow is displayed may become, and thus a shadow may be rendered darker. Also, in the region where the shadow is displayed, a color of the shadow or a darkness of the shadow may be uniformly applied. Alternatively, a shadow effect may be set, such that the color of the shadow becomes darker toward edges of a screen image. In other words, as shown in FIG. 6A, the color of the shadow may be displayed darker toward edges of the second image 605.

Comparing the second images 655 and 675 respectively shown in FIGS. 6A and 6B, a shadow display region or a shadow thickness displayed in the second image 675 are smaller than those in the second image 655. In other words, when a distance between the screen of the display apparatus 400 and the wall is small, a user receives an impression that a difference between distances to the screen of the display apparatus 400 and the wall is small. Therefore, even when the intensity of the shadow effect is reduced, the user may still recognize consistency between an image displayed on the screen of the display apparatus 400 and the wall.

On the other hand, when the distance between the screen of the display apparatus 400 and the wall is large, the user feels a significant difference between distances to the screen of the display apparatus 400 and the wall. In this case, the intensity of the shadow effect is increased, such that the user may recognize consistency between the image displayed on the screen of the display apparatus 400 and the wall.

Also, a shadow effect may be applied in correspondence to at least one edge of the first image. In detail, a shadow effect may be applied to the first image in correspondence to at least one of an edge parallel to a first side 621, an edge parallel to a second side 622, an edge parallel to a third side 623, and an edge parallel to a fourth side 624. FIG. 6A shows a case where a shadow effect is applied to an edge parallel to the first side 621 and an edge parallel to the fourth side 624.

According to an embodiment, an edge of the first image to which a shadow effect is applied may vary depending on settings of a user. For example, a user may request to display shadows at all four edge of the first image. The controller 420 may then generate a second image by applying a shadow effect to all four edges of the first image based on the request of the user.

According to an embodiment, an edge of the first image to which a shadow effect is applied may vary depending on settings of a display apparatus. For example, when a display panel is a flat panel, a display apparatus may apply a shadow effect, such that shadows appear on all four edges of the first image. In another example, when a display panel has a certain curvature, a display apparatus may apply a shadow effect, such that shadow appear on an edge parallel to the second side 622 and an edge parallel to the fourth side 624 from among four edges of the first image.

Furthermore, an edge of the first image to which a shadow effect is applied may be determined based on a result of detection by the sensor 460. In detail, a shadow effect may be applied to the first image based on at least one of a direction of incidence of light and intensity of the light, such that a shadow is rendered in a direction corresponding to the direction of incidence of the light. For example, when the sensor 460 senses that light is incident in a direction from the fourth side 624 of the display apparatus, a strong shadow may appear at an edge parallel to the fourth side 624 of the first image.

Furthermore, an edge of the first image to which a shadow effect is applied may be determined based on information about a light source input by a user. In detail, the user may input information about light sources around the display apparatus 400, e.g., information about position of a window and information about position of an artificial light source like a fluorescent lamp and/or a lighting lamp, to the display apparatus 400.

In detail, the controller 420 may display a user interface screen image for receiving information about at least one window through which light is incident to a space in which the display apparatus 400 is located. The user may then input information about the window to the display apparatus 400. Based on the information input by the user and the first distance, the display apparatus 400 may determine an edge or edges from among four edges of the first image to display a shadow.

Figure 7:
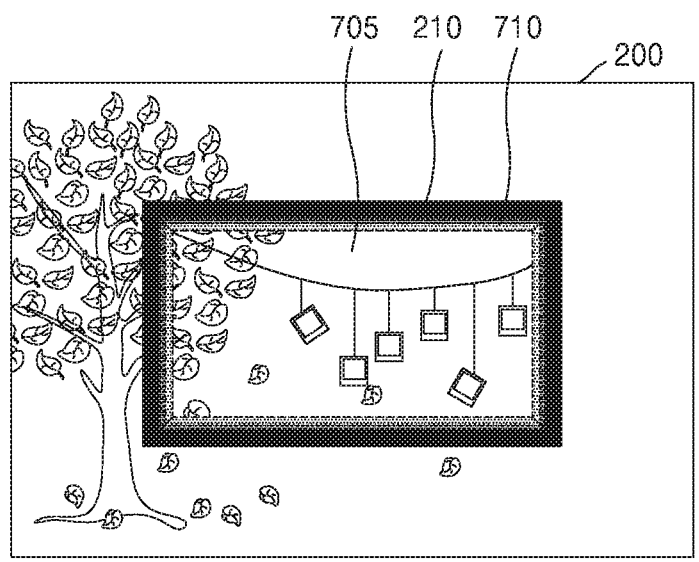
FIG. 7 is a diagram for describing an example of a screen image displayed on a display apparatus according to an embodiment.

FIG. 7 is a diagram for describing an example of a screen image displayed on a display apparatus according to an embodiment.

Referring to FIG. 7, the display apparatus 210 is attached to the region 200, which is the wall shown in FIGS. 2A and 2B. Referring to FIG. 7, a second image 705 to which a shadow effect is applied is displayed on the display apparatus 210 according to an embodiment. The shadow effect is applied to the second image 705 based on a first distance. In detail, shadows 710 are displayed at four edges of the second image 705.

Furthermore, the controller 420 may darken the color or the darkness of the shadows in outward directions of the second image 705, as in the second image 705 shown in FIG. 7.

Figure 8:
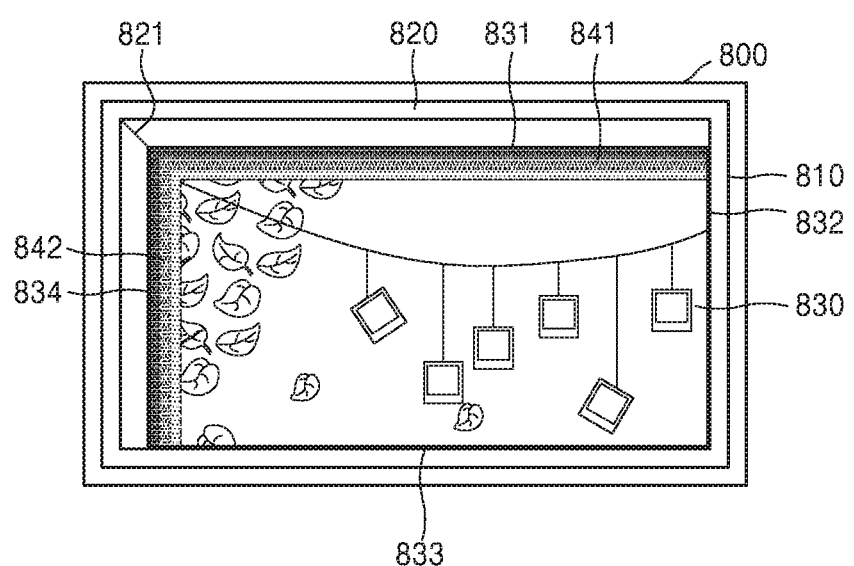
FIG. 8 is a diagram for describing another example of a screen image displayed on a display apparatus according to an embodiment.

FIG. 8 is a diagram for describing another example of a screen image displayed on a display apparatus according to an embodiment. A display apparatus 800 shown in FIG. 8 may correspond to the display apparatus 400 shown in FIG. 4. Furthermore, the display apparatus 800 may display a second image 830 on a screen 810.

A display apparatus according to an embodiment of the disclosure may generate a virtual picture frame 820 having a thickness corresponding to a first distance and display the second image 830 such that shadows are cast by the picture frame.

In detail, the controller 420 may determine the thickness of the virtual picture frame 820 as a first thickness based on the first distance and generate the second image 830 by displaying a first image in the virtual picture frame 820 having the first thickness. In detail, a shadow effect may be applied to the first image, to give the appearance that a shadow is cast by the virtual picture frame 820 having the first thickness.

Furthermore, during generation of the virtual picture frame 820, the dimension of the virtual picture frame excluding the thickness, e.g., the shape, the color, and the width, of the virtual picture frame 820, may vary according to settings of users or settings of the display apparatus 400.

The first thickness, which is the thickness of the virtual picture frame 820, may be identical to or proportional to the first distance.

In detail, as shown in FIGS. 6A and 6B, virtual picture frames 603 and 604 having the first distance 601 as thicknesses thereof are generated, and the virtual picture frames 603 and 604 may be displayed over the second images 655 and 675, respectively. Then, the display apparatus 400 may display the second images 655 and 675 over which the virtual picture frames 603 and 604, respectively, are displayed on the screen of the display 430. In FIG. 8, a first thickness 821 is a length that a virtual picture frame 820 protrudes from a screen (that is, a plane on which in which a second image 830 is displayed).

Referring to FIG. 8, the display apparatus 800 may display the second image 830, over which the virtual picture frame 820 is displayed, on the screen 810. Shadow 841 and shadow 842 rendered in the second image 830 may be displayed darker in directions toward the virtual picture frame 820.

FIG. 8 exemplifies a case in which the shadow 841 corresponding to a first edge 831 and the shadow 842 corresponding to a fourth edge 834 are displayed and no shadow is displayed at a second edge 832 and a third edge 833. However, this is only an example, and as described above, shadows may also be provided on other edges.

When the virtual picture frame 820 is displayed over the second image 830, a user may recognize that shadows displayed in the second image 830 are cast by the virtual picture frame 820. Accordingly, the display apparatus 400 may display the second image 830 including more natural shadows.

Figure 9A:
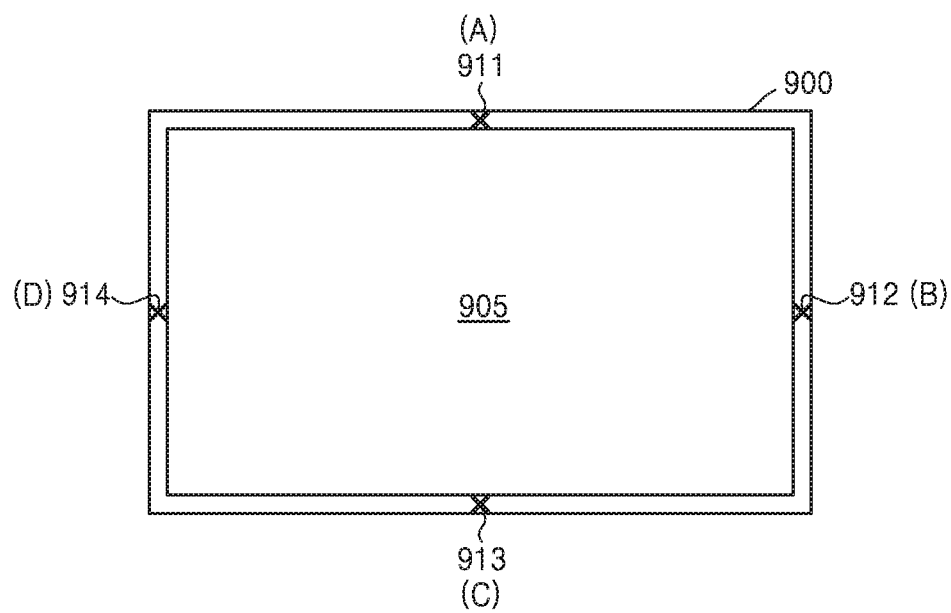
FIG. 9A is a diagram for describing a sensor included in a display apparatus according to an embodiment.

FIG. 9A is a diagram for describing a sensor included in a display apparatus according to an embodiment.

Figure 9B:
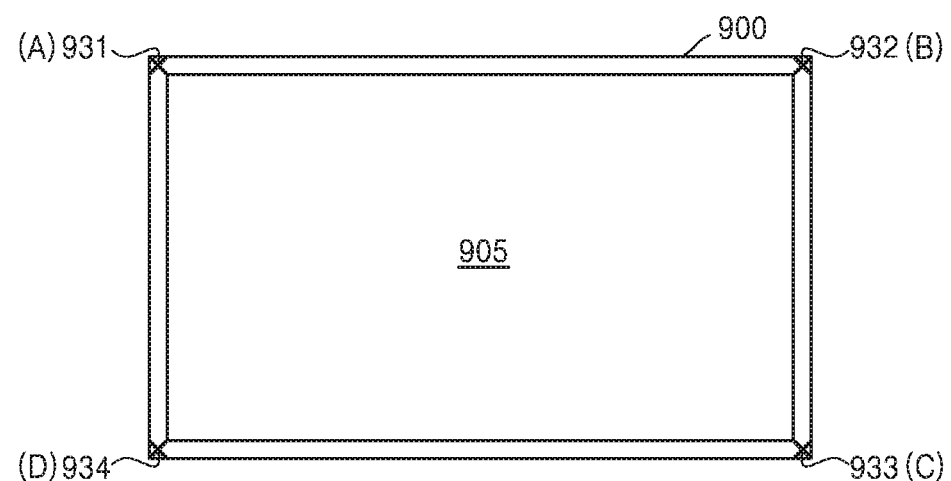
FIG. 9B is another diagram for describing a sensor included in a display apparatus according to an embodiment.

FIG. 9B is another diagram for describing a sensor included in a display apparatus according to an embodiment.

A display apparatus 900 shown in FIGS. 9A and 9B corresponds to the display apparatus 400 described above with reference to FIG. 4. According to an embodiment, the sensor 460 may include a plurality of illuminance sensors A-D. The intensity of a shadow effect to be applied to a first image may be adjusted according to at least one of an intensity of light (i.e., the brightness of the light) and a direction of the light sensed by the illuminance sensors A-D.

Furthermore, the illuminance sensors A-D may be disposed at a plurality of points 911-914 adjacent to the screen of the display apparatus 900, respectively.

Referring to FIG. 9A, the display apparatus 900 may include four illuminance sensors A-D. The four illuminance sensors A-D may be disposed at a first point 911, a second point 912, a third point 913, and a fourth point 914, respectively. Accordingly, the display apparatus 900 may sense directions of light received from all directions around a screen 905 and intensity of light in each direction.

Alternatively, the display apparatus 900 may include two illuminance sensors (B and D). Generally, light applied to the display apparatus 900 may include natural light, which is light applied through a window, and artificial light applied by an artificial light source attached to a ceiling or a wall, e.g., a fluorescent lamp and/or a lighting lamp. Therefore, to sense directions in which the natural light and the artificial light are applied, it is advantageous that light sources are detected on the left and right sides of the display apparatus 900. Accordingly, in some embodiments, the two illuminance sensors D and B included in the display apparatus 900 may be disposed at the fourth point 914 and the second point 912, respectively.

Referring to FIG. 9B, the display apparatus 900 may include four illuminance sensors A-D. In this embodiment, the four illuminance sensors A-D may be arranged at a fifth point 931, a sixth point 932, a seventh point 933, and an eighth point 934. Furthermore, when the display apparatus 900 includes two illuminance sensors, the two illuminance sensors included in the display apparatus 900 may be disposed at the fifth point 931 and the sixth point 932 (i.e., illuminance sensors A and B) or at the seventh point 933 and the eighth point 934 (i.e., illuminance sensors C and D), respectively.

In detail, the display apparatus 400 may apply a shadow effect based on a result of sensing by the sensor 460, such that a shadow is displayed at one or more edges of a first image. Based on a direction and a light intensity of light sensed by the illuminance sensors A-D included in the sensor 460, the display apparatus 400 may determine one or more edges from among four edges of the first image to display a shadow and intensity of the shadow. In detail, the controller 420 may determine one or more edges from among the four edges of the first image to display a shadow and intensity of the shadow. The controller 420 may then control the controller 420 to apply a shadow effect to the first image according to results of the determinations.

Figure 10A:
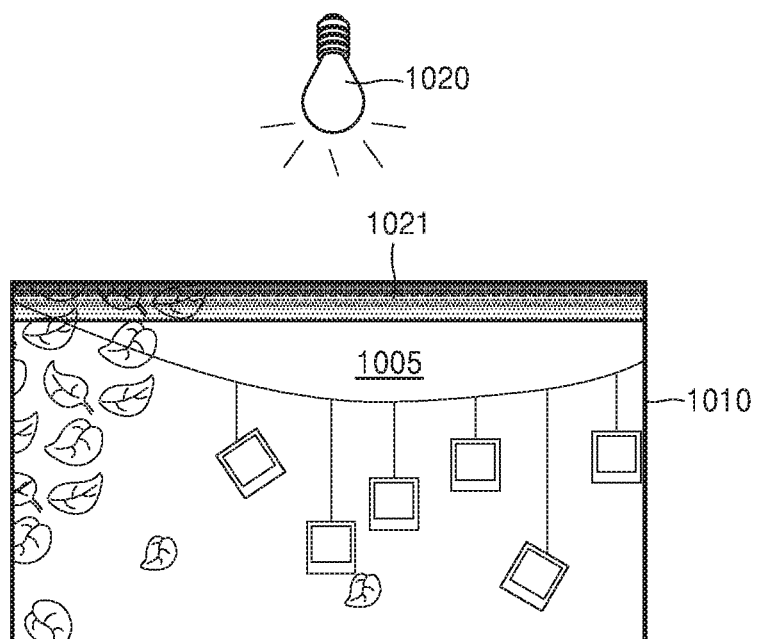
FIG. 10A is a diagram for describing an example of a screen image displayed on a display apparatus according to an embodiment.

FIG. 10A is a diagram for describing an example of a screen image displayed on a display apparatus according to an embodiment.

Figure 10B:
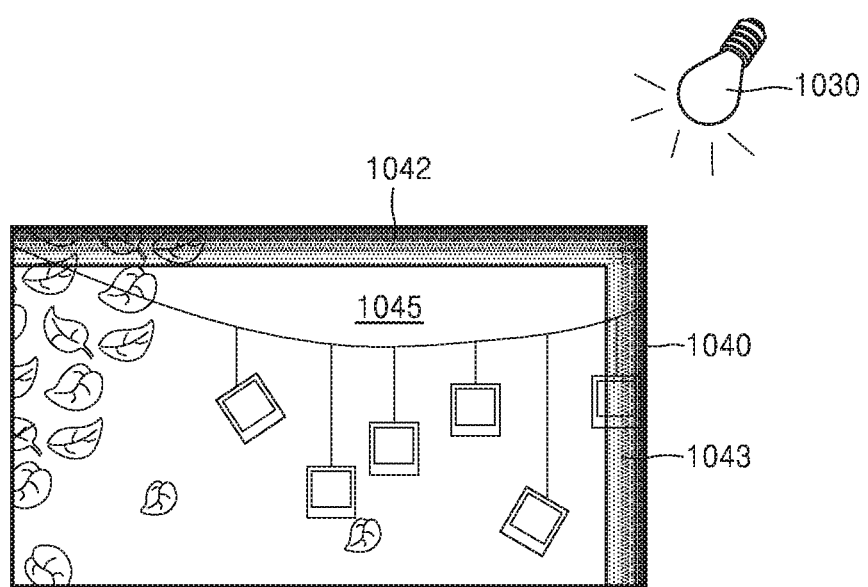
FIG. 10B is a diagram for describing another example of a screen image displayed on a display apparatus according to an embodiment.

FIG. 10B is a diagram for describing another example of a screen image displayed on a display apparatus according to an embodiment.

Screen images 1010 and 1040 shown in FIGS. 10A and 10B are displayed on the display 430 of the display apparatus 400.

FIG. 10A exemplifies a case where there is provided an artificial light 1020 above the display apparatus 400 as a light source for applying light to the display apparatus 400.

Referring to FIG. 10A, since a light source is above the display apparatus 400, the display apparatus 400 may display a shadow in a region 1021 corresponding to the upper edge of a screen 1005. Also, the color of the shadow may be displayed darker in a direction toward the upper edge, that is, a direction toward the light source.

FIG. 10B exemplifies a case where there is provided an artificial light 1030 at a position above and right of the display apparatus 400 as a light source for applying light to the display apparatus 400.

Referring to FIG. 10B, since a light source is at a position above and right of the display apparatus 400, the display apparatus 400 may display a shadow in a region 1042 corresponding to the upper edge of the screen 1045 and a region 1043 corresponding to the right edge of the screen 1045. Also, the color of the shadow may be displayed darker in directions toward the upper edge and the right edge, that is, a direction toward the light source.

Also, the display apparatus 400 may additionally adjust the intensity of the shadow effect depending on whether a screen image is output during the daytime or at night. Generally, during the daytime, a lot of light is applied to the display apparatus 400 through a window or the like, and an amount of light applied to the display apparatus 400 is reduced at night. Accordingly, the controller 420 may control to display the shadow to be rendered darker in the second image displayed during the daytime and to display the shadow to be rendered lighter in the second image output at night.

Figure 11:
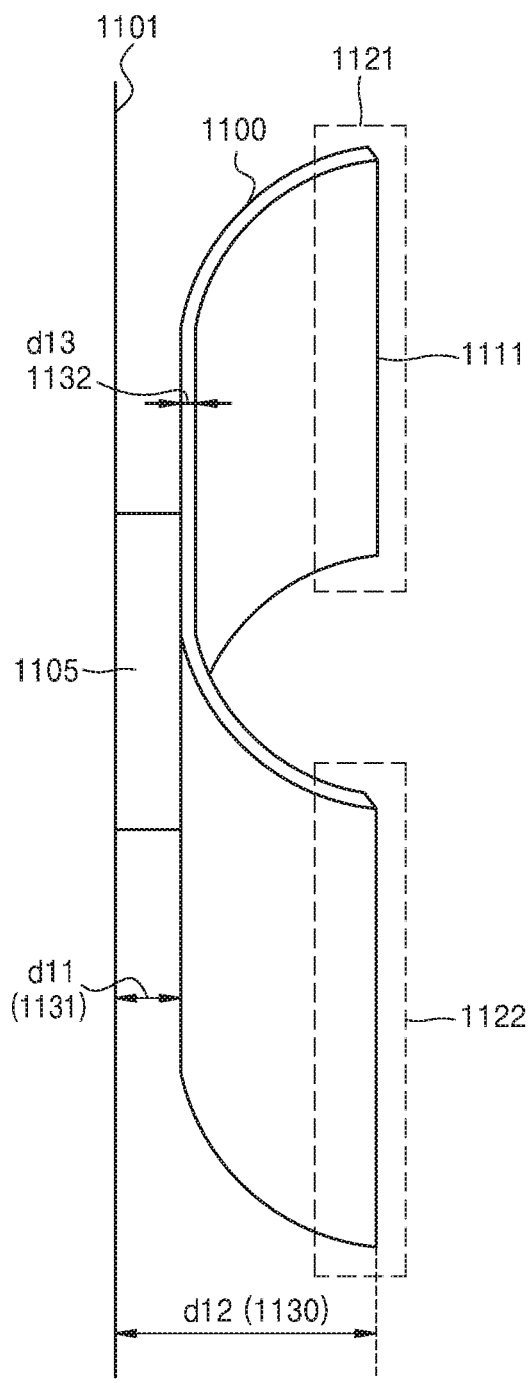
FIG. 11 is a diagram showing a display apparatus in which a display panel has a curvature.

FIG. 11 is a diagram showing a display apparatus in which a display panel has a curvature.

FIG. 11 shows an embodiment in which a display apparatus 1100 having a certain curvature is attached to a wall 1101. In other words, the display apparatus 1100 may also be referred to as a curved display apparatus 1100. The display apparatus 1100 corresponds to the display apparatus 400 shown in FIG. 4.

Referring to FIG. 11, a distance between a screen 1111 of the display apparatus 1100 and the wall 1101 increases in directions from the center of the display apparatus 1100 toward both ends of the display apparatus 1100. In detail, a distance between the screen 1111 of the display apparatus 1100 and the wall 1101 at the center of the display apparatus 1100 is a sum of a thickness d11 1131 of a wall mount 1105 and a thickness d13 1132 of the display apparatus 1100. Furthermore, a distance between the screen 1111 of the display apparatus 1100 and the wall 1101 at an end point (e.g., 1121 or 1122) of the display apparatus 1100 is a thickness d12 1130, which is greater than a sum of the thickness d11 1131 of the wall mount 1105 and the thickness d13 1132 of the display apparatus 1100.

According to an embodiment, as the display apparatus 400 is located farther from the wall 1101, the value of the first distance increases. Furthermore, the display apparatus 400 may set the intensity of a shadow effect proportional to the first distance. Therefore, the display apparatus 1100 including a display panel having a certain curvature may increase the intensity of shadow effects on a left side 1122 and a right side 1121 of the screen 1111 of the display apparatus 1100 as the display apparatus 1100 is located farther from the wall 1101. In detail, the controller 420 may display larger and darker shadows in regions in the first image corresponding to the left side 1122 and the right side 1121 of the screen 1111 as the display apparatus 1100 is located/moved farther from the wall 1101.

Furthermore, when the display apparatus 400 is a curved display apparatus 1100, the first distance may be obtained based on regions corresponding to the left side 1122 and the right side 1121 of the screen 1111. In other words, in the embodiment shown in FIG. 11, the first distance may be d12 1130 or a value proportional to d12 1130.

Also, when the display apparatus 400 is the curved display apparatus 1100, the first distance may be set based on the curvature of a display panel. For example, the greater the curvature of the display panel is, the farther the regions corresponding to the left side 1122 and right side 1121 of the screen 1111 will be from the wall. Accordingly, the controller 420 may set the first distance value to a value proportional to the curvature of the display panel.

Here, curvature information may be included in product information stored in the display apparatus 400. In this case, the controller 420 may use the stored curvature information.

Furthermore, the display apparatus 400 may obtain the curvature of the display panel through the communicator 410. In detail, the display apparatus 400 may store product information like a product model, a serial number, a product version, etc. The controller 420 of the display apparatus 400 may obtain the first distance by using product specification information stored in the display apparatus 400. For example, the controller 420 may access the service center server of the display apparatus 400 through the communicator 410 and transmit product information to the service center server. Then, the service center server may transmit curvature information corresponding to the product information of the display apparatus 400 to the display apparatus 400 in response thereto.

Figure 12:
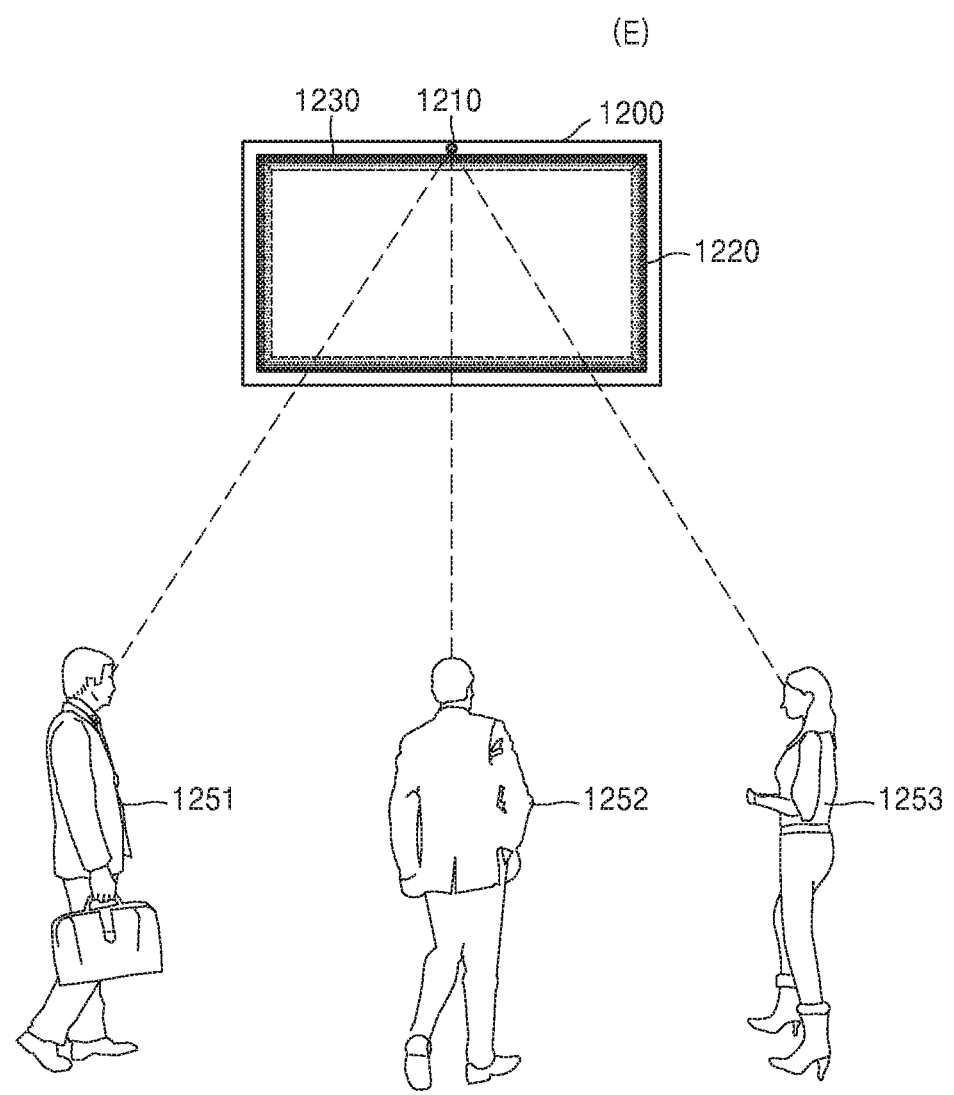
FIG. 12 is a diagram showing a position of a person recognized by a display apparatus according to an embodiment.

FIG. 12 is a diagram showing a position of a person recognized by a display apparatus according to an embodiment. A display apparatus 1200 corresponds to the display apparatus 400 shown in FIG. 4.

According to an embodiment, the sensor 460 of the display apparatus 400 may further include a sensor E for sensing a position of a user. In detail, the sensor 460 may sense a position of a line of sight, such as a direction and a height of the line of sight, of a user viewing a screen of the display apparatus.

In detail, the sensor 460 may further include at least one sensor E capable of recognizing a position of a user, e.g., an image sensor and/or an infrared sensor. In detail, the image sensor E may be disposed on a front surface 1210 of the display apparatus 1200 and may capture an image ahead (i.e., in front of) of the display apparatus 1200. Furthermore, the display apparatus 1200 may recognize a person being an object in a capture image and determine a position of the recognized object as a position of a user. Furthermore, in the case of an infrared sensor, the infrared sensor may detect infrared rays emitted from a user in front of the display apparatus 1200. In this case, the display apparatus 1200 may determine the location of a user based on a result of the detection by the infrared sensor.

Next, the controller 420 may generate a second image by applying a shadow effect to a first image based on the position of the user and a distance. Here, the position of the user may refer to a position of a line of sight, such as a direction and a height of the line of sight, of the user viewing a screen of the display apparatus 400.

The controller 420 may control to adjust the intensity of a shadow effect to be applied to the first image based on the position of the user and the first distance.

FIG. 12 shows a screen image 1220 including a second image obtained by applying a shadow effect to a first image when a user 1252 is in front of a center portion of the display apparatus 1200. When the user 1252 is in front of the center portion of the display apparatus 1200, a shadow applied to the first image may be uniformly displayed throughout a screen image. In other words, shadows may be displayed with uniform thickness and uniform intensity at four sides of the screen image 1220 like a shadow 1230 displayed in the screen image 1220.

When a user 1251 is in front of the left portion of the display apparatus 1200, a shadow displayed on the left side of the screen image 1220, which is a shadow displayed on a side close to the user 1251, may be displayed darker, whereas a shadow displayed on the right side of the screen image 1220, which is a shadow displayed on a side far from the user 1251, may be displayed relatively lighter.

On the contrary, when the user 1253 is in front of the right portion of the display apparatus 1200, a shadow displayed on the right side of the screen image 1220, which is a shadow displayed on a side close to the user 1253, may be displayed darker, whereas a shadow displayed on the left side of the screen image 1220, which is a shadow displayed on a side far from the user 1253, may be displayed relatively lighter.

Furthermore, in some embodiments, when the display apparatus 1200 displays a second image including a virtual picture frame as shown in FIG. 8, the display apparatus 1200 may adjust a position, a size, and a darkness of a shadow cast by the virtual picture frame in the second image according to a position of a user, that is, a position of a line of sight of the user.

Figure 13:
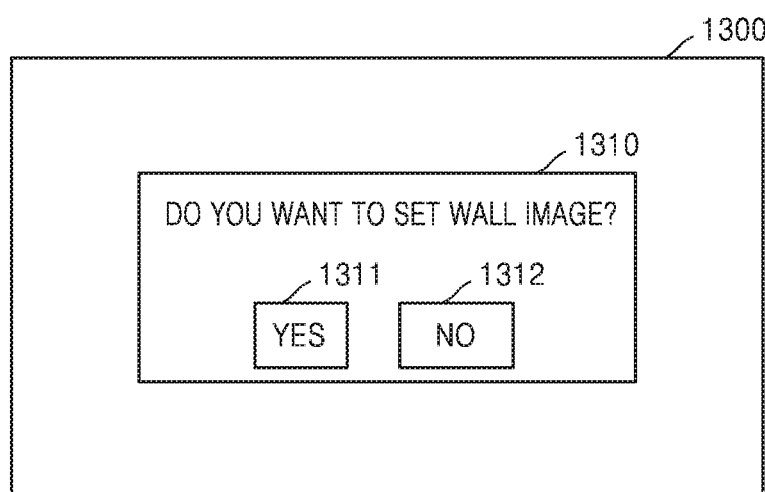
FIG. 13 is a diagram showing an example of a user interface screen image displayed on a display apparatus according to an embodiment.

FIG. 13 is a diagram showing an example of a user interface screen image displayed on a display apparatus according to an embodiment.

According to an embodiment, the display apparatus 400 may externally receive or set a wall image corresponding to a second image. In detail, the display apparatus 400 may receive an input from a user.

Referring to FIG. 13, the display 430 may output a user interface screen image 1300.

The user interface screen image 1300 may include a menu window 1310 for requesting inputting or setting a wall image.

To set a wall image, a user may select a key menu 1311 (YES) that requests setting. When the key menu 1311 requesting setting of a wall image is input, the display apparatus 400 may subsequently perform an operation for receiving the wall image. For example, a message 'please input a wall image via USB port' may be displayed. Then, the user may input video data including the wall image to the display apparatus 400 through a USB port. In another example, a message 'please activate a wireless network and transmit a wall image' may be displayed. Then, the user may activate a Wi-Fi network of an external device (e.g., a smartphone (not shown) of the user) that is to be connected to the display apparatus 400 via a wireless network and transmit a first image to the display apparatus 400 via the Wi-Fi network.

When a key menu 1312 (NO) for not requesting setting of a wall image is input, the display apparatus 400 may provide the user with images corresponding to famous paintings, images corresponding to landscapes, and photograph images instead of a wall image. In detail, the display apparatus 400 may display a user interface screen image (not shown) via which a plurality of famous paintings may be selected. The user may then select any one famous painting on the user interface screen image (not shown). The display apparatus 400 may then set the selected famous painting as the first image and generate a second image by applying a shadow effect to the first image. Next, the second image may be displayed. In this case, the user would be able to use the display apparatus 400 like as a framed famous painting.

Figure 14A:
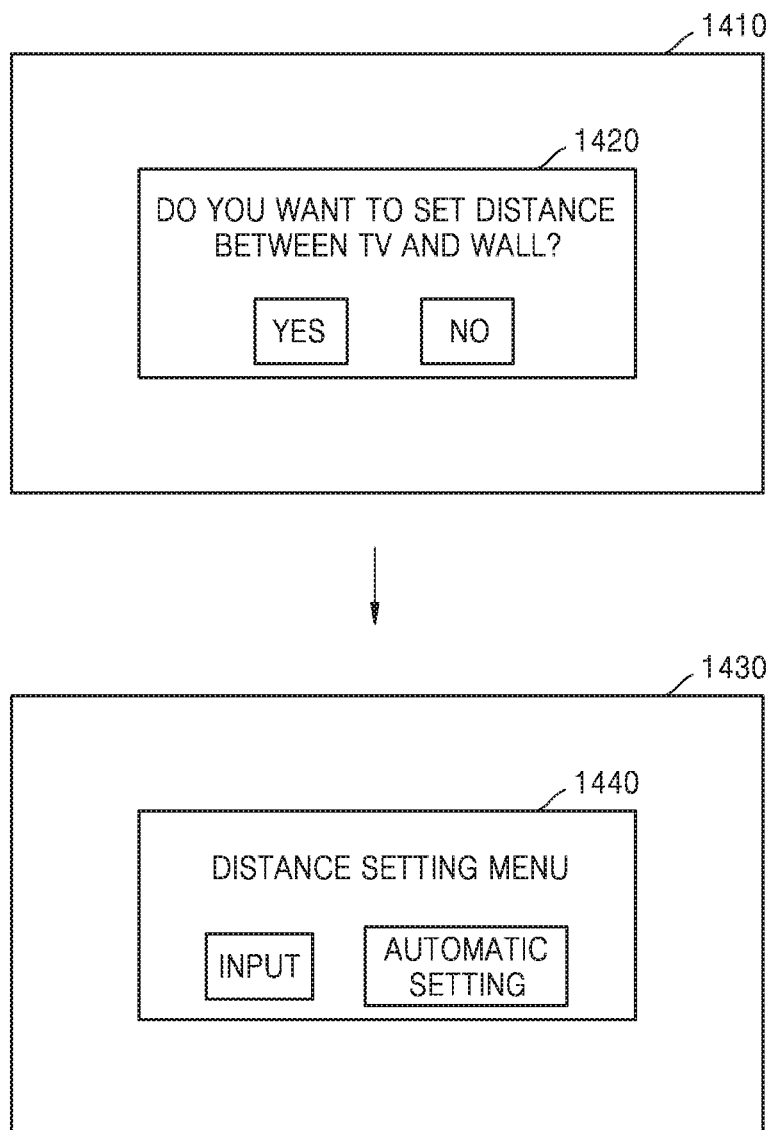
FIGS. 14A and 14B are diagrams showing other examples of user interface screen images displayed on a display apparatus according to an embodiment.
Figure 14B:
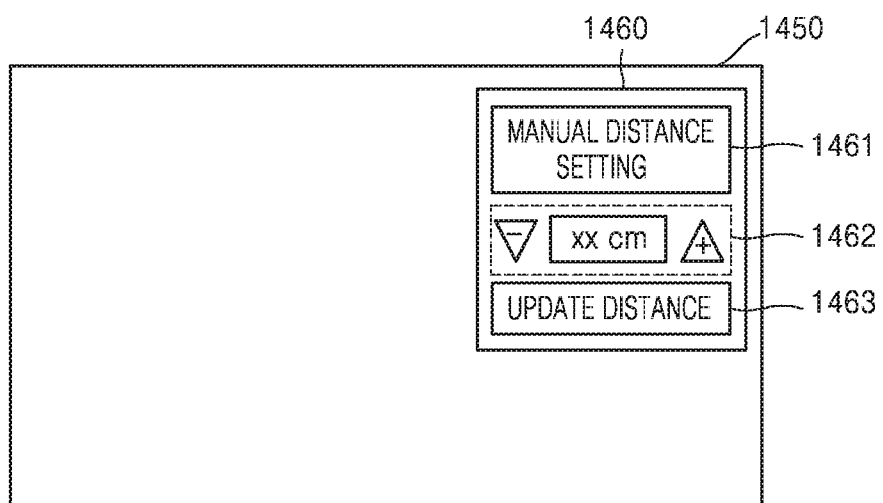

FIGS. 14A and 14B are diagrams showing other examples of user interface screen images displayed on a display apparatus according to an embodiment.

The controller 420 may control to output a user interface screen image for receiving information about a first distance.

Referring to FIG. 14A, a user interface screen image 1410 may include a menu window 1420 for setting the first distance, which is a distance between a display apparatus and a wall.

A user may select at least one of selection keys included in the menu window 1420 through the user interface 450.

In detail, the user may select a 'Yes' key of the menu window 1420 to continue setting of the first distance. When the user selects a 'No' key in the menu window 1420, displaying of the screen image may be terminated without setting the first distance.

The display apparatus 400 may output a user interface screen image 1430 subsequent to the user interface screen image 1410. The user interface screen image 1430 may include a menu window 1440 for automatically or manually setting the first distance.

In detail, the user may select an 'Input' key 1441 of the menu window 1420 to continue manual setting of the first distance.

Also, the user may select an 'automatic setting' key 1442 of the menu window 1440 to continue automatic setting of the first distance. When the user selects the 'automatic setting' key 1442, the controller 420 controls to automatically measure or obtain the first distance. For example, the controller 420 may automatically access a service server of the manufacturer of the display apparatus 400 through the communicator 410 and obtain information about the first distance.

Referring to FIG. 14B, when the 'Input' key 1441 is selected in the menu window 1440, the display apparatus 400 may output a user interface screen image 1450 including a menu window 1460 for manually setting the first distance.

In detail, the menu window 1460 may include a menu 1462 for inputting a detailed value of the first distance. Furthermore, the menu window 1460 may further include a message 1461 indicating that the first distance will be manually set. Furthermore, the menu window 1460 may further include a key 1463 for requesting an update of the first distance that is already set.

For example, when the user selects the key 1463, the display apparatus 400 may delete a previously stored first distance value and may receive or set a new first distance, and store the new first distance.

Figure 15:
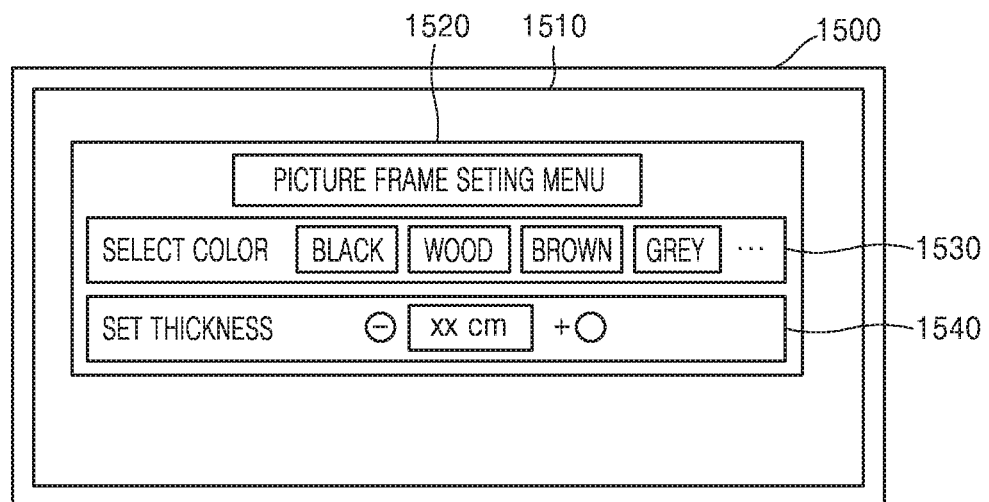
FIG. 15 is a diagram for describing another example of a user interface screen image displayed on a display apparatus according to an embodiment.

FIG. 15 is a diagram for describing another example of a user interface screen image displayed on a display apparatus according to an embodiment.

Referring to FIG. 15, the display apparatus 400 may display a user interface screen image 1500 for setting a virtual picture frame displayed over a second image.

In detail, the controller 420 may control to display the user interface screen image 1500 for setting at least one of a color and a shape of a virtual picture frame displayed over the second image. A user may input information about at least one of a color and a shape of the virtual picture frame to the display apparatus 400 through the user interface 450. Next, the controller 420 may determine at least one of a color and a shape of the virtual picture frame based on the setting of the user.

Referring to FIG. 15, the user interface screen image 1500 may include a menu window 1520 for setting at least one of a color and a shape of a virtual picture frame. The menu window 1520 may include a menu 1530 for setting a color of a virtual picture frame and a menu 1540 for setting a thickness (width) of the virtual picture frame.

In the virtual picture frame, a thickness indicating a depth from a screen of the display apparatus 400 to a wall (e.g., the first thickness described above with reference to FIG. 7) may be a value identical to the first distance or a value that is a value proportional to the first distance. Therefore, the thickness is not a value that may be set through the menu window 1520 and is set by the display apparatus 400. In other words, the menu 1540 is for setting the thickness of the virtual picture frame (see, e.g., thickness 821 in FIG. 8) and not for setting the first distance, which is a thickness indicating a depth from a screen of the display apparatus 400 to the wall.

Furthermore, the user interface screen image 1500 may include a virtual picture frame 1510 that reflects the items selected through the menu window 1520. In other words, when a shape of a virtual picture frame is set through the menu window 1520, the controller 420 may display the user interface screen image 1500, to which the virtual picture frame generated according to settings is applied, in real time, such that that a user may preview the set virtual picture frame. In other words, the controller 420 may provide a preview function of a virtual picture frame generated according to setting.

Figure 16A:
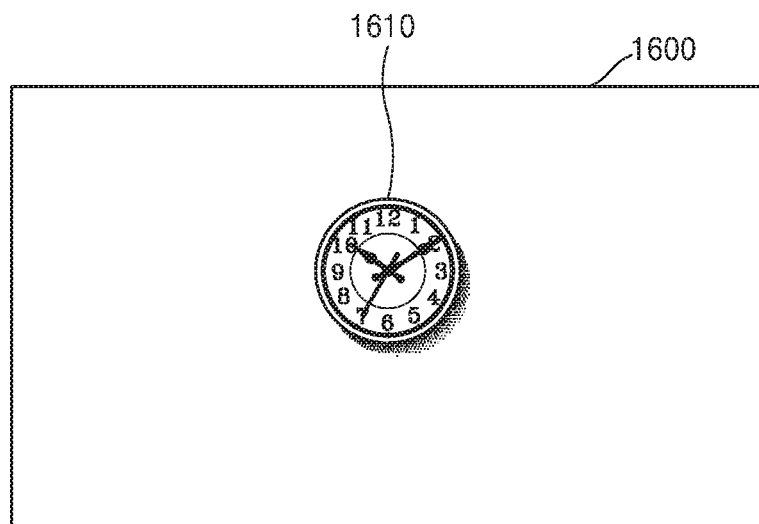
FIG. 16A is a diagram for describing an example of a screen image displayed on a display apparatus according to an embodiment.

FIG. 16A is a diagram for describing an example of a screen image displayed on a display apparatus according to an embodiment.

The display apparatus 400 may display a graphic image 1610 representing a virtual clock over a second image 1600. When the graphic image 1610 representing a virtual clock is displayed over the second image 1600, a user may receive an impression of a clock attached onto the wall. Furthermore, time information may be provided to the user without a separate wall clock.

In detail, the graphic image 1610 may represent the appearance of a clock with a shadow. In detail, the graphic image 1610 may include the appearance of a clock having a thickness corresponding to a first distance and a shadow casted on the clock. In this case, the second image is displayed with a same depth as that of a wall behind the display apparatus 400, and the virtual clock has a thickness proportional to the first distance, thus being displayed that the virtual clock is protruding from the wall.

Figure 16B:
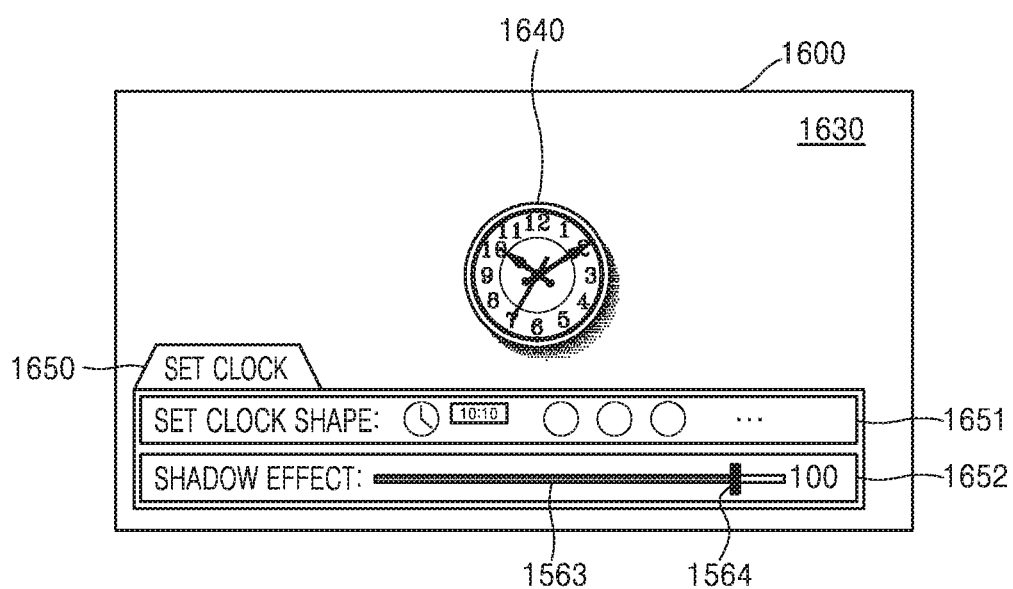
FIG. 16B is a diagram for describing another example of a user interface screen image displayed on a display apparatus according to an embodiment.

FIG. 16B is a diagram for describing another example of a user interface screen image displayed on a display apparatus according to an embodiment.

According to an embodiment, the controller 420 may control to display a user interface screen image 1630 for setting the type of a virtual clock displayed over the second image 1600 and the intensity of a shadow effect to be applied to the virtual clock.

Referring to FIG. 16B, the user interface screen image 1630 may include a menu window 1650 including a menu 1651 for selecting a virtual clock. Furthermore, the menu window 1650 may further include a menu 1652 for setting the intensity of a shadow effect to be applied to the virtual clock. Here, the menu 1652 may be a menu for adjusting the intensity of shadow effect to adjust a stereoscopic impression or a depth of the virtual clock.

For example, when an adjust key 1564 for selecting a shadow effect is moved to a value close to zero of an adjust bar 1563, a shadow will hardly be displayed over the virtual clock (i.e., an opaque shadow). Meanwhile, when the adjust key 1564 is moved to a value close to 100 of the adjust bar 1563, larger and darker shadow may be displayed over the virtual clock.

Thus, the user may set through the user interface screen image 1630, such that a virtual clock having a most wanted shape and a most comfortable stereoscopic impression is displayed over the second image.

Furthermore, when the user selects a virtual clock through the menu window 1650, the controller 420 may control to display the user interface screen image 1630 including a clock 1640 reflecting selections in real time.

Figure 17:
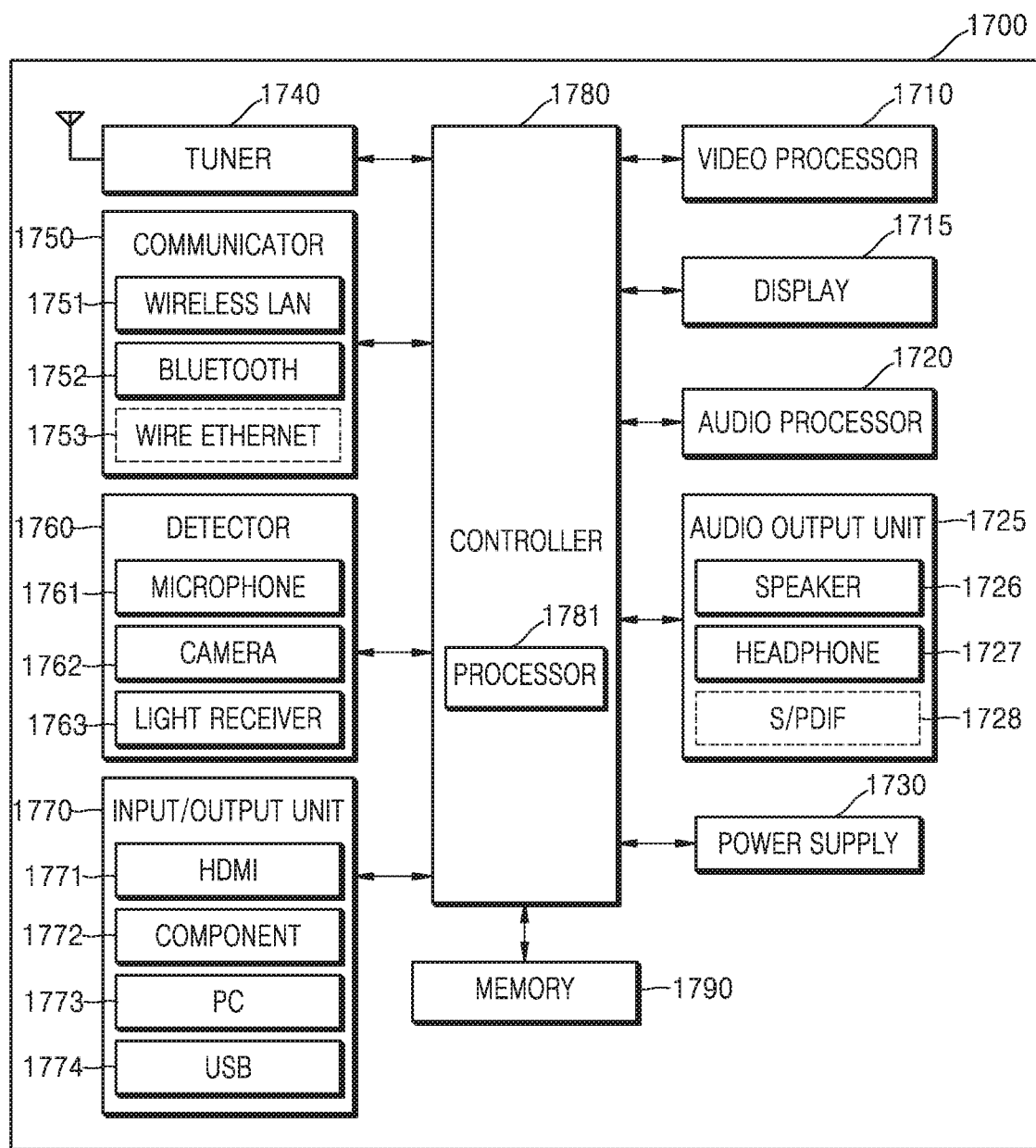
FIG. 17 is a block diagram showing a display apparatus according to another embodiment.

FIG. 17 is a block diagram showing a display apparatus according to another embodiment.

A display apparatus 1700 according to an embodiment may correspond to one of the display apparatuses (e.g., 400) described above with reference to FIGS. 1 to 16B. Therefore, descriptions of the display apparatus 1700 identical to the descriptions given above with those in FIGS. 1 to 16B will be omitted.

Referring to FIG. 17, the display apparatus 1700 includes a video processor 1710, a display 1715, an audio processor 1720, an audio output unit 1725, a power supply 1730, a tuner 1740, a communicator 1750, a detector 1760, an input/output unit 1770, a controller 1780, and a storage 1790.

At least one of the input/output unit 1770 and the communicator 1750, the display 1715, the controller 1780, the detector 1760, and the storage 1790 of the display apparatus 1700 shown in FIG. 17 correspond to the communicator 410, the display 430, the controller 420, the sensor 460, and the memory 480 of the display apparatus 400 shown in FIG. 4, respectively. Therefore, descriptions of the display apparatus 1700 identical to those given above in relation to the display apparatus 400 will be omitted.

The video processor 1710 processes video data received by the display apparatus 1700. The video processor 1710 may perform various image processing tasks with regard to video data, such as decoding, scaling, noise filtering, frame rate transformation, and resolution transformation.

The controller 1780 may control to receive a write request regarding the video data processed by the video processor 1710, encrypt the video data, and write encoded video data in a memory device (not shown) included in the controller 1780 or the storage 1790, e.g., a RAM (not shown).

The display 1715 displays a video included in a broadcast signal received via the tuner 1740, under the control of the controller 1780. Furthermore, the display 1715 may display content (e.g., a moving picture) input via the communicator 1750 or the input/output unit 1770.

Furthermore, the display 1715 may output an image stored in the storage 1790, under the control of the controller 1780. Furthermore, the display 1715 may display a voice user interface (UI) (e.g., a UI including a voice instruction guide) for performing a voice recognition task or a motion UI (e.g., a UI including a user motion guide for motion recognition) for performing a motion recognition task.

The audio processor 1720 processes audio data. The audio processor 1720 may perform various audio processing tasks with regard to audio data, such as decoding, amplification, and noise filtering. Meanwhile, the audio processor 1720 may include a plurality of audio processing modules for processing audios corresponding to a plurality of content.

The audio output unit 1725 outputs an audio included in a broadcast signal received via the tuner 1740, under the control of the controller 1780. The audio output unit 1725 may output an audio (e.g., a voice or a sound) input via the communicator 1750 and/or the input/output unit 1770, under the control of the controller 1780. Furthermore, the audio output unit 1725 may output an audio stored in the storage 1790, under the control of the controller 1780. The audio output unit 1725 may include at least one of a speaker 1726, a headphone output terminal 1727, and a Sony/Philips digital interface (S/PDIF) output terminal 1728. The audio output unit 1725 may include a combination of the speaker 1726, the headphone output terminal 1727, and the S/PDIF output terminal 1728.

The power supply 1730 supplies power input from an external power source to internal components 1710 through 1790 of the display apparatus 1700 under the control of the controller 1780. Furthermore, the power supply 1730 may supply power output by one, two, or more batteries (not shown) disposed in the display apparatus 1700 to internal components 1710 to 1790 of the display apparatus 1700 under the control of the controller 1780.

The tuner 1740 may tune and select frequency corresponding to a channel to be received by the display apparatus 1700 among a large number of frequency ingredients in a broadcasting signal that is received via a wire or wirelessly by amplifying, mixing, and resonating the broadcasting signal. A broadcasting signal includes an audio data signal, a video signal, and additional information (e.g., electronic program guide (EPG)).

The tuner 1740 may receive a broadcasting signal in a frequency band corresponding to a channel number (e.g., a cable broadcast No. 506) based on a user input (e.g., a control signal received from an external control apparatus (not shown), such as a channel number input, a channel up-down input, and a channel input on an EPG screen image).

The tuner 1740 may receive a broadcasting signal from various sources, such as a ground wave broadcasting service, a cable broadcasting service, a satellite broadcasting service, and an internet broadcasting service. The tuner 1740 may receive a broadcasting signal from sources like an analog broadcasting service or a digital broadcasting service. A broadcasting signal received by the tuner 1740 is decoded (e.g., audio decoding, video decoding, or additional information decoding) and is split to an audio signal, a video signal, and/or additional information. The audio signal, the video signal, and/or the additional information obtained from the broadcasting signal may be stored in the storage 1790 under the control of the controller 1780.

The display apparatus 1700 may include one tuner 1740 or a plurality of tuners 1740. In one embodiment, when the display apparatus 1700 includes the plurality of tuners 1740, a plurality of broadcast signals may be output to a plurality of windows constituting a multi-window screen image provided to the display 1715.

The tuner 1740 may be integrated with the display apparatus 1700, may be embodied as an independent device (e.g., a set-top box (not shown)) having a tuner electrically connected to the display apparatus 1700, or may be embodied as a tuner (not shown) connected to the input/output unit 1770.

The communicator 1750 may connect the display apparatus 1700 to an external device (e.g., an audio device) under the control of the controller 1780. The controller 1780 may transmit/receive content to/from the external device connected via the communicator 1750, download an application from the external device, or browse web pages via the external device. In detail, the communicator 1750 may access a network and receive content from an external device (not shown).

As described above, the communicator 1750 may include at least one of a short-range communication module (not shown), a wire communication module (not shown), and a mobile communication module (not shown).

FIG. 17 shows a case where the communicator 1750 includes a wireless LAN module 1751 and a Bluetooth module 1752 (i.e., a wire Ethernet module 1753 is shown in dotted lines). However, this is only an example.

Furthermore, in some embodiments, the communicator 1750 may include a combination of the wireless LAN module 1751, the Bluetooth module 1752, and the wire Ethernet module 1753. The communicator 1750 may receive a control signal of a control apparatus (not shown) under the control of the controller 1780. A control signal may be embodied as a Bluetooth signal, a RF signal, or a Wi-Fi signal.

The communicator 1750 may include short-range wireless communication modules other than the Bluetooth module 1752, e.g., a near field communication (NFC) module (not shown), a Bluetooth low energy (BLE) module, etc.

The detector 1760 may detect a voice of a user, an image of the user, or an interaction of the user.

The microphone 1761 receives a voice uttered by a user. The microphone 1761 may transform a received voice into an electric signal and output the electric signal to the controller 1780. A user's voice may include a voice corresponding to a menu or a function of the display apparatus 1700. For example, a voice recognition range of the microphone 1761 may be within a distance about 4 meters from the microphone 1761, where the voice recognition range of the microphone 1761 may vary based on the volume of a voice of a user and surrounding environmental conditions (e.g., a volume of a speaker, ambient noise, etc.).

The microphone 1761 may be integrated with the display apparatus 1700 or may be embodied as an independent device. The microphone 1761 may be independent and be electrically connected to the display apparatus 1700 via the communicator 1750 or the input/output unit 1770.

According to an embodiment, the microphone 1761 may receive a sound wave signal other than a user's voice. In detail, the microphone 1761 may receive an ultrasound signal.

In some embodiments, the microphone 1761 may be omitted according to performances and structures of the display apparatus 1700.

A camera 1762 receives an image (e.g., successive frames) corresponding to a user's motion including a gesture within a recognition range of the camera 1762. For example, the recognition range of the camera 1762 may be within a distance from about 0.1 m to about 5 m from the camera 1762. A user's motion may include a motion of a body part of the user, e.g., a face, a face expression, a hand, a fist, a finger, etc. The camera 1762 may transform a received image into an electric signal and output the electric signal to the controller 1780, under the control of the controller 1780. The camera 1762 may correspond to the camera 440 shown in FIG. 4.

By using a received result of motion recognition, the controller 1780 may select a menu displayed on the display apparatus 1700 or perform a task corresponding to the result of the motion recognition. For example, the controller 1780 may change channel, adjust volume, or move a cursor.

The camera 1762 may include a lens (not shown) and an image sensor (not shown). The camera 1762 may provide optical zoom or digital zoom by using a plurality of lenses and image processing techniques. The recognition range of the camera 1762 may vary according to angles of the camera 1762 and surrounding environmental conditions. When the camera 1762 includes a plurality of cameras, a 3-dimensional (3D) still image or a 3D motion may be received by using the plurality of cameras.

The camera 1762 may be integrated with the display apparatus 1700 or may be embodied as an independent device. An independent device (not shown) including the camera 1762 may be electrically connected to the display apparatus 1700 via the communicator 1750 and/or the input/output unit 1770.

According to an embodiment, the camera 1762 may capture an image ahead of the display apparatus 1700, thereby sensing a position of a user or a position of a line of sight of the user.

In some embodiments, the camera 1762 may be omitted according to performances and structures of the display apparatus 1700.

A light receiver 1763 receives an optical signal (including a control signal) from an external control apparatus (not shown) via an optical window (not shown) of the bezel of the display 1715. The light receiver 1763 may receive an optical signal corresponding to a user input (e.g., a touch, a press, a touch gesture, a voice, or a motion) from the control apparatus. A control signal may be retrieved from the received optical signal under the control of the controller 1780.

For example, the light receiver 1763 may receive a signal corresponding to a position pointed by a control device (not shown) and transmit the signal to the controller 1780. For example, in case where a user interface screen image for receiving data or instructions from a user is displayed through the display 1715 and a user wants to input data or instructions to the display apparatus 1700 through a control device (not shown), when the user moves the control device (not shown) while contacting a finger to a touch pad (not shown) provided on the control device (not shown), the light receiver 1763 may receive a signal corresponding to the movement of the control device (not shown) and transmit the signal to the controller 1780. Furthermore, the light receiver 1763 may receive a signal indicating that a particular button provided on the controller (not shown) is pressed and transmit the signal to the controller 1780. For example, when the user presses a button-type touch pad (not shown) provided on the control device (not shown) with a finger, the light receiver 1763 may receive a signal indicating that the button-type touch pad (not shown) is pressed and transmit the signal to the controller 1780. For example, the signal indicating that the button-type touch pad (not shown) is pressed may be used as a signal for selecting one of items.

The input/output unit 1770 receives a video (e.g., moving pictures, etc.), an audio (e.g., voice, music, etc.), and additional information (e.g., an EPG, etc.) from outside of the display apparatus 1700 under the control of the controller 1780. The input/output unit 1770 may include at least one of a high-definition multimedia interface (HDMI) port 1771, a component jack 1772, a PC port 1773, and a USB port 1774. The input/output unit 1770 may include a combination of the HDMI port 1771, the component jack 1772, the PC port 1773, and the USB port 1774, as shown in FIG. 17.

Configurations and operations of the input/output unit 1770 may vary according to example embodiments.

The controller 1780 controls the overall operations of the display apparatus 1700, controls signal flows between internal components 1710 through 1790 of the display apparatus 1700, and processes data. When a user input is applied or a certain pre-set condition is satisfied, the controller 1780 may execute an operating system (OS) and various applications stored in the storage 1790.

The controller 1780 may include a RAM (not shown) that stores a signal or data input from outside of the display apparatus 1700 or is used as a storage area corresponding to various tasks performed by the display apparatus 1700, a ROM (not shown) having stored therein control programs for controlling the display apparatus 1700, and a processor 1781.

According to an embodiment, the controller 1780 may control to perform operations for generating and displaying a second image.

The processor 1781 may include a graphics processing unit (GPU) (not shown) for processing graphics data corresponding to a video. The processor 1781 may be embodied as a system-on-chip (SoC) having integrated thereon a core (not shown) and a GPU (not shown). The processor 1781 may be a hardware processor and may include a single core, dual cores, triple cores, quad cores, and cores in multiples thereof.

Furthermore, the processor 1781 may include a plurality of processors. For example, the processor 1781 may include a main processor (not shown) and a sub processor (not shown) that operates in a sleep mode.

The processor 1781 may include a graphic processor (not shown) which generates a screen image including various objects, such as icons, images, and texts, by using a calculator (not shown) and a renderer (not shown). The calculator calculates property values, such as coordinates, shapes, sizes, and colors for displaying respective objects, according to layouts of screen images by using a detected user interaction. The renderer generates screen images of various layouts including objects based on property values calculated by the calculator. A screen image generated by the renderer is displays in a display area of the display 1715.

FIG. 18 is a flowchart of an image processing method according to an embodiment.

An image processing method 1800 according to an embodiment is a method of processing an image to be displayed in a display apparatus. The image processing method 1800 is identical to the operations performed in the display apparatus (e.g., 400) according to an embodiment described above with reference to FIGS. 1 to 17. Therefore, descriptions of the image processing method 1800 according to the embodiment identical to the descriptions given above with reference to FIGS. 1 to 17 will be omitted. Hereinafter, the image processing method 1800 will be described with reference to the display apparatus 400 shown in FIG. 4.

Referring to FIG. 18, in the image processing method 1800, an image is received from an external device (not shown) (operation S1810). In detail, a first image, which is an image of a wall behind the display apparatus 400, is obtained in the operation S1810. The operation S1810 may be performed through the communicator 410. In detail, the operation S1810 may be performed through the communicator 410 under the control of the controller 420.

Information about a first distance corresponding to a distance between the front surface of the display apparatus 400 and the wall is obtained (operation S1820). The operation S1820 may be performed under the control of the controller 420. Furthermore, the information about the first distance may be obtained by various methods, e.g., a manual setting of a user, an automatic acquisition based on product information, etc.

A second image is generated by applying a shadow to the first image based on the information about the first distance (operation S1830). In detail, when an image received from the external device is displayed on the display 430 included in the display apparatus 400, a shadow effect may be applied to at least one of the four sides of the first image, which is the image received from the external device, based on the first distance, thereby generating the second image. The operation S1830 may be performed through the controller 420.

The image generated in the operation S1830 is displayed (operation S1840). In detail, the second image generated in the operation S1830 is displayed through the display 430 in the operation S1840. The operation S1840 may be performed through the display 430. In detail, the operation S1840 may be performed through the display 430 under the control of the controller 420.

One or more embodiments may be implemented by a computer-readable recording medium, such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically include a computer-readable instruction, a data structure, a program module, other data of a modulated data signal, or another transmission mechanism, and an example thereof includes an arbitrary information transmission medium. In addition, some embodiments may be implemented as computer programs or computer program products including instructions executable by a computer, such as computer programs executed by a computer.

An image processing method according to an embodiment and a display apparatus therefor may display a screen image having a same depth impression as that of a wall behind the display apparatus. Therefore, a user may recognize that the wall behind the display apparatus and a second image displayed on a screen of the display are consistent and continuous with regard to each other.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
a display;
a communicator configured to communicate with an external device;
a memory storing one or more instructions; and
a controller comprising at least one processor configured to:
execute the one or more instructions stored in the memory to obtain an image;
obtain a first distance corresponding to a distance between a front surface of the display apparatus and a wall behind the display apparatus; and
when the image is displayed on the display, apply a shadow effect to at least one of four sides of the image, wherein at least one of an area of a region in the image to which the shadow effect is applied and a darkness of a shadow in the region is adjusted based on the first distance.

2. The display apparatus of claim 1, wherein
the processor is further configured to execute the one or more instructions to adjust an intensity of the shadow effect to generate a depth impression of the image that corresponds to a depth impression of the wall behind the display apparatus.

3. The display apparatus of claim 1, further comprising:
a sensor configured to sense a state of a light source,
wherein the processor is further configured to execute the one or more instructions to apply the shadow effect on at least one of the four sides of the image based on the state of the light source and the first distance.

4. The display apparatus of claim 3, wherein
the sensor comprises a plurality of illuminance sensors configured to sense an intensity and a direction of light from the light source, and
the processor is further configured to execute the one or more instructions to adjust an intensity of the shadow effect applied to the image based on the first distance, and the intensity and direction of the light from the light source.

5. The display apparatus of claim 1, wherein
the processor is further configured to execute the one or more instructions to:
determine a thickness of a virtual picture frame as a first thickness based on the first distance;
apply the shadow effect in the virtual picture frame having the first thickness to the image; and
display the image having applied thereto the shadow effect in the virtual picture frame having the first thickness.

6. The display apparatus of claim 5, wherein
the processor is further configured to execute the one or more instructions to adjust at least one of the area of a region in the image to which the shadow effect is applied and the darkness of the shadow in the region to which the shadow effect is applied, based on the first thickness.

7. The display apparatus of claim 5, further comprising:
a user interface,
wherein the processor is further configured to:
execute the one or more instructions to display a user interface screen image for setting at least one of a color and a shape of the virtual picture frame;
control the user interface to receive information about at least one of a color and a shape of the virtual picture frame from a user; and
display the image having applied thereto the shadow effect in the virtual picture frame having the color and shape according to the received information.

8. The display apparatus of claim 1, further comprising:
a user interface configured to receive a certain instruction or information,
wherein the processor is further configured to execute the one or more instructions to:
display a user interface screen image for receiving the first distance; and
control the user interface to receive the first distance from a user.

9. The display apparatus of claim 1, further comprising:
a user interface configured to receive a certain instruction or information,
wherein the processor is further configured to execute the one or more instructions to display a user interface screen image for receiving information about at least one window in a space in which the display apparatus is located for allowing light to be incident into the space.

10. The display apparatus of claim 9, wherein
the processor is further configured to execute the one or more instructions to apply the shadow effect on at least one of the four sides of the image based on information about the at least one window received via the user interface and based on the first distance.

11. The display apparatus of claim 1, further comprising:
at least one sensor configured to sense a position of a user,
wherein the processor is further configured to execute the one or more instructions to apply the shadow effect on at least one of the four sides of the image based on the position of the user and based on the first distance.

12. A method, performed by a display apparatus, of processing an image, the method comprising:
obtaining an image;
obtaining a first distance corresponding to a distance between a front surface of the display apparatus and a wall behind the display apparatus;
applying, when the image is displayed on a display included in the display apparatus, a shadow effect on at least one of four sides of the image, wherein at least one of an area of a region in the image to which the shadow effect is applied and a darkness of a shadow in the region is adjusted based on the first distance; and
displaying the image to which the shadow effect is applied.

13. The method of claim 12, wherein the applying of the shadow effect comprises:
adjusting an intensity of the shadow effect to generate a depth impression of the image that corresponds to a depth impression of the wall behind the display apparatus.

14. The method of claim 12, wherein the applying of the shadow effect comprises:
applying the shadow effect to at least one of the four sides of the image based on the first distance and based on a state of a light source sensed by using a plurality of illuminance sensors included in the display apparatus.

15. The method of claim 12, wherein the applying of the shadow effect comprises:
determining a thickness of a virtual picture frame as a first thickness based on the first distance;
applying the shadow effect in the virtual picture frame having the first thickness to the image; and
displaying the image to which the shadow effect is applied in the virtual picture frame having the first thickness.

16. The method of claim 15, further comprising:
displaying a user interface screen image for setting at least one of a color and a shape of the virtual picture frame;
receiving information about the at least one of a color and a shape of the virtual picture frame; and
displaying the image having applied thereto the shadow effect in the virtual picture frame having the at least one of color and shape according to the received information.

17. The method of claim 12, wherein the applying of the shadow effect comprises:
applying the shadow effect to at least one of the four sides of the image based on the first distance and based on a position of the user sensed by using at least one sensor configured to sense the position of the user.

18. A non-transitory computer readable recording medium having recorded thereon a computer program comprising instructions executable by a computer, wherein the program comprises:
instructions for obtaining an image;
instructions for obtaining a first distance corresponding to a distance between a front surface of a display apparatus and a wall behind the display apparatus;
instructions for applying, when the image is displayed on a display included in the display apparatus, a shadow effect on at least one of four sides of the image,
wherein at least one of an area of a region in the image to which the shadow effect is applied and a darkness of a shadow in the region is adjusted based the first distance; and
instructions for displaying the image to which the shadow effect is applied.

* * * * *